US010049558B2

(12) United States Patent
Funakoshi et al.

(10) Patent No.: US 10,049,558 B2
(45) **Date of Patent: *Aug. 14, 2018**

(54) INFORMATION PROCESSING SYSTEM, TERMINAL, INFORMATION PROCESSING METHOD, INFORMATION PROCESSING METHOD OF TERMINAL, AND PROGRAM

(71) Applicant: HONDA MOTOR CO., LTD., Tokyo (JP)

(72) Inventors: Kotaro Funakoshi, Wako (JP); Tomoyuki Sahata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,357

(22) Filed: Feb. 16, 2017

(65) Prior Publication Data

US 2017/0263106 A1 Sep. 14, 2017

(30) Foreign Application Priority Data

Mar. 9, 2016 (JP) ................................ 2016-046027

(51) Int. Cl.
*G08B 21/00* (2006.01)
*G08B 21/24* (2006.01)
(Continued)

(52) U.S. Cl.
CPC .............. *G08B 21/24* (2013.01); *H04L 67/26* (2013.01); *H04L 67/325* (2013.01); *H04W 4/02* (2013.01);
(Continued)

(58) Field of Classification Search
None
See application file for complete search history.

(56) References Cited

U.S. PATENT DOCUMENTS

2008/0088437 A1* 4/2008 Aninye .............. G07C 9/00111 340/539.13
2008/0088438 A1* 4/2008 Aninye .............. G07C 9/00111 340/539.13
(Continued)

FOREIGN PATENT DOCUMENTS

JP 5055468 8/2012

OTHER PUBLICATIONS

U.S. Office Action dated Dec. 8, 2017 from corresponding U.S. Appl. No. 15/446,171, 13 pages.

*Primary Examiner* — Curtis King
(74) *Attorney, Agent, or Firm* — Rankin, Hill & Clark LLP

(57) ABSTRACT

An information processing system is configured so that a terminal generates state information using information based on each of a first condition and a second condition in condition information, transmits condition information and state information to an information processing device at each reminder determination timing, receives notification information from the information processing device, provides a notification of a reminder if the state information satisfies the first condition or the second condition, and changes the reminder determination timing according to a state of charge of the terminal and the information processing device generates notification information if the acquired state information satisfies first or second condition information.

10 Claims, 15 Drawing Sheets

(51) Int. Cl.
*H04L 29/08* (2006.01)
*H04W 4/02* (2018.01)
*H04W 4/20* (2018.01)

(52) U.S. Cl.
CPC ............. *H04W 4/20* (2013.01); *Y02D 70/142* (2018.01); *Y02D 70/164* (2018.01)

(56) References Cited

U.S. PATENT DOCUMENTS

2008/0195312 A1* 8/2008 Aaron .................. G06Q 10/109 455/418
2009/0164823 A1* 6/2009 Aaltonen ........... G01R 31/3648 713/340
2009/0275354 A1* 11/2009 Bulmer ................. G06F 1/3203 455/522
2011/0177830 A1* 7/2011 Clipsham ................. G08B 1/08 455/456.3
2011/0188351 A1* 8/2011 Aaron .................. G06Q 10/109 368/10
2011/0314402 A1* 12/2011 Kikin-Gil ............ G06Q 10/109 715/772
2012/0034906 A1 2/2012 Ueno et al.
2012/0035925 A1* 2/2012 Friend ...................... G06F 3/167 704/235
2013/0182128 A1* 7/2013 Amtrup .................. H04N 1/387 348/207.1
2014/0147092 A1* 5/2014 Liu ....................... H04M 1/656 386/224
2014/0181741 A1* 6/2014 Apacible .............. G06Q 10/109 715/810
2014/0203940 A1* 7/2014 Bonner .................. G08B 21/24 340/601
2015/0142897 A1* 5/2015 Alten ...................... H04L 51/36 709/206
2015/0207926 A1* 7/2015 Brown .............. H04M 1/72597 455/414.1
2015/0382138 A1* 12/2015 Bose ....................... H04L 51/10 455/456.3
2016/0005299 A1* 1/2016 Zomet .................... G08B 21/24 340/573.1
2016/0210602 A1 7/2016 Siddique et al.
2016/0284199 A1* 9/2016 Dotan-Cohen ........ G08B 21/24
2017/0011426 A1 1/2017 Marchenko et al.
2017/0055898 A1* 3/2017 Bandyopadhyay .. A61B 5/4812
2017/0243468 A1* 8/2017 Dotan-Cohen ........ G08B 21/24

* cited by examiner

FIG. 2

| IDENTIFIER | TARGET POSITION INFORMATION | TARGET TIME INFORMATION | ... |
|---|---|---|---|
| ID1001 | AA BUILDING OF SHIBUYA | 17:00 ON JULY 7, 2015 | ... |

FIG. 3

| IDENTIFIER | CURRENT POSITION INFORMATION | CURRENT TIME INFORMATION | SENSOR INFORMATION | | |
|---|---|---|---|---|---|
| | | | MOVEMENT SPEED | TEMPERATURE | ... |
| ID1001 | LATITUDE XX1 LONGITUDE YY1 | 17:00 ON JULY 7, 2015 | ... | ... | ... |
| ID1001 | LATITUDE XX2 LONGITUDE YY2 | 18:50 ON JULY 9, 2015 | ... | ... | ... |
| ... | ... | ... | ... | ... | ... |

FIG. 4

| IDENTIFIER | COORDINATES OF TARGET POSITION | TARGET TIME INFORMATION | ... |
|---|---|---|---|
| ID1001 | COORDINATES OF AA BUILDING OF SHIBUYA | 17:00 ON JULY 7, 2015 | ... |
| ID1002 | COORDINATES OF AA BUILDING OF SHIBUYA | 18:30 ON JULY 8, 2015 | ... |
| ID1003 | COORDINATES OF BB BUILDING OF SHINJUKU | 21:00 ON JULY 7, 2015 | ... |
| ... | ... | ... | ... |

| CAPACITY LEVEL | REMINDER DETERMINATION CYCLE |
|---|---|
| FIRST CAPACITY LEVEL | $T_1$ |
| SECOND CAPACITY LEVEL | $T_2$ |
| THIRD CAPACITY LEVEL | $T_3$ |
| FOURTH CAPACITY LEVEL | $T_4$ |

| AREA | CORRECTION VALUE |
|---|---|
| FIRST AREA | $\alpha_1$ |
| SECOND AREA | $\alpha_2$ |
| THIRD AREA | $\alpha_3$ |

FIG. 19

| MOVEMENT SPEED RANGE | CORRECTION VALUE |
|---|---|
| $V_A \leqq V < V_B$ | $\beta_1$ |
| $V_B \leqq V < V_C$ | $\beta_2$ |
| $V_C \leqq V < V_D$ | $\beta_3$ |

INFORMATION PROCESSING SYSTEM, TERMINAL, INFORMATION PROCESSING METHOD, INFORMATION PROCESSING METHOD OF TERMINAL, AND PROGRAM

CROSS-REFERENCE TO RELATED APPLICATION

Priority is claimed on Japanese Patent Application No. 2016-046027, filed Mar. 9, 2016, the content of which is incorporated herein by reference.

BACKGROUND OF THE INVENTION

Field of the Invention

The present invention relates to an information processing system, a terminal, an information processing method, an information processing method of the terminal, and a program.

Description of Related Art

An information notification system configured so that a position and a time designated by a user are registered in a server and the server transmits notification information to the terminal if a current position received from the terminal of the user corresponds to the registered position and a current time corresponds to the registered time is known (for example, see Japanese Patent Publication No. 5055468 (hereinafter referred to as Patent Literature 1)).

SUMMARY OF THE INVENTION

However, in the information notification system of Patent Literature 1, both a position-related determination and a time-related determination are performed at a server side at the time of transmission of notification information. Thus, for example, if the number of users using the information notification system increases and the number of terminals increases, a processing load on the server is likely to increase.

Therefore, for example, processing being distributed so that the server performs one of the position-related determination and the time-related determination and the terminal performs the other when a notification of the notification information (i.e., a reminder) is provided can be conceived. However, in this case, power consumption increases due to a process in which the terminal side performs the position- or time-related determination. In this case, because the terminal having a reminder function is of a portable type and is generally driven by a battery, duration of the battery is shortened due to the increase of the power consumption.

An aspect according to the present invention has been made in view of the above-described circumstances, and an objective of the present invention is to provide an information processing system, a terminal, an information processing method, an information processing method of the terminal, and a program capable of suppressing the reduction of duration of a battery in a terminal in an information processing system configured so that a process is operated in the terminal and an information processing device in a distributed manner when a notification of a reminder is provided.

To achieve the above-described objective, the present invention adopts the following aspects.

(1) An aspect of the present invention is an information processing system including a terminal and an information processing device, wherein the terminal includes: a condition information generation unit configured to acquire a first condition and a second condition and generate condition information using at least one of the acquired first and second conditions; a state information generation unit configured to acquire information based on each of the first condition and the second condition and generate state information using information according to the condition information among the acquired information; a transmission unit configured to transmit the condition information to the information processing device and transmit the state information to the information processing device at each reminder determination timing; a reception unit configured to receive notification information from the information processing device; a reminder generation unit configured to generate a reminder if it is determined that the state information satisfies one of the first condition and the second condition according to reception of the notification information; a notification unit configured to provide a notification of the generated reminder; a state-of-charge detection unit configured to detect a state of charge in the terminal; and a timing control unit configured to change the reminder determination timing according to the state of charge detected by the state-of-charge detection unit, and wherein the information processing device includes: an acquisition unit configured to acquire the condition information and the state information transmitted by the terminal; a condition determination unit configured to generate the notification information if it is determined that the acquired state information satisfies one of the first condition and the second condition included in the condition information; and an output unit configured to transmit the notification information to the terminal.

(2) In the above-described aspect (1), the timing control unit may make a change so that a time interval serving as the reminder determination timing is shortened according to an increase in a capacity of a battery based on the detected state of charge.

(3) In the above-described aspect (1) or (2), the timing control unit may display a confirmation screen for allowing a user to confirm a change in the reminder determination timing according to the state of charge detected by the state-of-charge detection unit and execute control related to a change in a reminder issuance timing on the basis of an operation performed on the confirmation screen.

(4) In the above-described aspect (3), the timing control unit may not change the reminder determination timing if an operation indicating that the reminder determination timing is not to be changed has been performed on the confirmation screen.

(5) In any one of the above-described aspects (1) to (4), the timing control unit may correct a time interval to be changed as the reminder determination timing on the basis of a distance between a target position indicated by target position information and a current position of the terminal as the first condition.

(6) In any one of the above-described aspects (1) to (5), the timing control unit may correct a time interval to be changed as the reminder determination timing on the basis of a movement speed of the terminal.

(7) An aspect of the present invention is a terminal including: a condition information generation unit configured to acquire a first condition and a second condition and generate condition information using at least one of the acquired first and second conditions; a state information generation unit configured to acquire information based on each of the first condition and the second condition and generate state information using information according to the condition information among the acquired information;

a transmission unit configured to transmit the condition information to the information processing device and transmit the state information to the information processing device at each reminder determination timing; a reception unit configured to receive notification information from the information processing device; a reminder generation unit configured to generate a reminder if it is determined that the state information satisfies one of the first condition and the second condition according to reception of the notification information; a notification unit configured to provide a notification of the generated reminder; a state-of-charge detection unit configured to detect a state of charge in the terminal; and a timing control unit configured to change the reminder determination timing according to the state of charge detected by the state-of-charge detection unit.

(8) An aspect of the present invention is an information processing method in an information processing system including a terminal and an information processing device, the information processing method including: a condition information generation procedure in which a condition information generation unit of the terminal acquires a first condition and a second condition and generates condition information using at least one of the acquired first and second conditions; a state information generation procedure in which a state information generation unit of the terminal acquires information based on each of the first condition and the second condition and generates state information using information corresponding to the condition information among the acquired information; a transmission procedure in which a transmission unit of the terminal transmits the condition information to the information processing device and transmits the state information to the information processing device at each reminder determination timing; a reception procedure in which a reception unit of the terminal receives notification information from the information processing device; a reminder generation procedure in which a reminder generation unit of the terminal generates a reminder if it is determined that the state information satisfies one of the first condition and the second condition when the notification information is received; a notification procedure in which a notification unit of the terminal provides a notification of the generated reminder; a state-of-charge detection procedure in which a state-of-charge detection unit of the terminal detects a state of charge in the terminal; a timing control procedure in which a timing control unit of the terminal changes the reminder determination timing according to the state of charge detected by the state-of-charge detection unit; an acquisition procedure in which an acquisition unit of the information processing device acquires the condition information and the state information transmitted by the terminal; a condition determination procedure in which a condition determination unit of the information processing device generates the notification information if it is determined that the acquired state information satisfies one of the first condition and the second condition included in the condition information; and an output procedure in which an output unit of the information processing device transmits the notification information to the terminal.

(9) An aspect of the present invention is an information processing method of a terminal, the information processing method including: a condition information generation procedure in which a condition information generation unit acquires a first condition and a second condition and generates condition information using at least one of the acquired first and second conditions; a state information generation procedure in which a state information generation unit acquires information based on each of the first condition and the second condition and generates state information using information corresponding to the condition information among the acquired information; a transmission procedure in which a transmission unit transmits the condition information to the information processing device and transmits the state information to the information processing device at each reminder determination timing; a reception procedure in which a reception unit receives notification information from the information processing device; a reminder generation procedure in which a reminder generation unit generates a reminder if it is determined that the state information satisfies one of the first condition and the second condition when the notification information is received; a notification procedure in which a notification unit provides a notification of the generated reminder; a state-of-charge detection procedure in which a state-of-charge detection unit detects a state of charge in the terminal; and a timing control procedure in which a timing control unit changes the reminder determination timing according to the state of charge detected in the state-of-charge detection procedure.

(10) An aspect of the present invention is a program for causing a computer of a terminal to execute: a condition information generation procedure of acquiring a first condition and a second condition and generating condition information using at least one of the acquired first and second conditions; a state information generation procedure of acquiring information based on each of the first condition and the second condition and generating state information using information corresponding to the condition information among the acquired information; a transmission procedure of transmitting the condition information to the information processing device and transmitting the state information to the information processing device at each reminder determination timing; a reception procedure of receiving notification information from the information processing device; a reminder generation procedure of generating a reminder if it is determined that the state information satisfies one of the first condition and the second condition when the notification information is received; a notification procedure of providing a notification of the generated reminder; a state-of-charge detection procedure of detecting a state of charge in the terminal; and a timing control procedure of changing the reminder determination timing according to the state of charge detected in the state-of-charge detection procedure.

According to the above-described aspects (1), (7), (8), (9), and (10), it is possible to change the timing at which a process related to a reminder determination is executed according to the state of charge of the terminal when a reminder notification condition determination is performed by the terminal and the information processing device in a distributed manner. Thereby, the number of times of processing related to the reminder determination to be performed per unit time is changed. As a result, it is possible to reduce power consumption due to the processing related to the reminder determination and suppress the reduction of duration of the battery in the terminal.

In the case of the above-described aspect (2), a frequency at which the processing related to the reminder determination per unit time is executed is increased in a state in which there is a surplus in the battery capacity. Thereby, the accuracy of the reminder notification can increase as the battery capacity increases.

In the case of the above-described aspect (3), it is possible to notify the user that the reminder determination timing has changed. Also, the user can make a change in the reminder determination timing by taking the user's intention into account because it is possible to make general changes related to the reminder determination timing.

In the case of the above-described aspect (4), it is possible to maintain the accuracy of the reminder notification so that the reminder determination timing does not change as control related to the change in the reminder determination timing in which the user's intention is taken into account.

In the case of the above-described aspect (5), the correction is performed according to the distance to the target position for the reminder determination timing determined on the basis of the battery capacity. Thereby, because the accuracy of the reminder notification can be increased, for example, when the position of the terminal is close to the target position, the usability of the reminder notification function is improved.

In the case of the above-described aspect (6), the correction is performed according to the movement speed of the terminal for the reminder determination timing determined on the basis of the battery capacity. Thereby, because the accuracy of the reminder notification is increased or decreased according to the movement speed of the terminal, the usability of the reminder notification function is improved.

BRIEF DESCRIPTION OF THE DRAWINGS

FIG. 2 is a diagram illustrating an example of condition information to which an identifier is attached according to the first embodiment.

FIG. 3 is a diagram illustrating an example of state information to which an identifier is attached according to the first embodiment.

FIG. 4 is a diagram illustrating an example of information stored in a reminder database of an information processing device according to the first embodiment.

FIG. 19 is a diagram illustrating an example of a movement speed correspondence correction value table according to a third embodiment.

DETAILED DESCRIPTION OF THE INVENTION

First Embodiment

First, an overview of the present embodiment will be described.

In the present embodiment, a user operates a terminal such as a smartphone to input a desired place (hereinafter referred to as target position information) and a desired time (hereinafter referred to as target time information) for which a notification of a reminder is desired to be provided. The terminal registers the input information therein and one piece of the input information, for example, the target position information, is transmitted to an information processing device such as a server. The terminal transmits the current position information acquired at each of predetermined time intervals to the information processing device after transmitting the target position information. The information processing device determines whether the current position is in a predetermined range including the target position and transmits information indicating that the terminal is located in the predetermined range if the current position is in the predetermined range. That is, the information processing device of the present embodiment performs a determination on, for example, only one piece among the input information without performing the determination on all information input into the terminal. Further, the terminal determines only whether the current time is within a predetermined time period including the target time and provides a notification of the reminder if the current time is within the predetermined time period when information indicating that the terminal is located in the predetermined range is received from the information processing device. Thus, in the present embodiment, a reminder notification process is performed by the terminal and the information processing device in a distributed manner.

Hereinafter, the embodiments of the present invention will be described with reference to the drawings.

Figure 1:
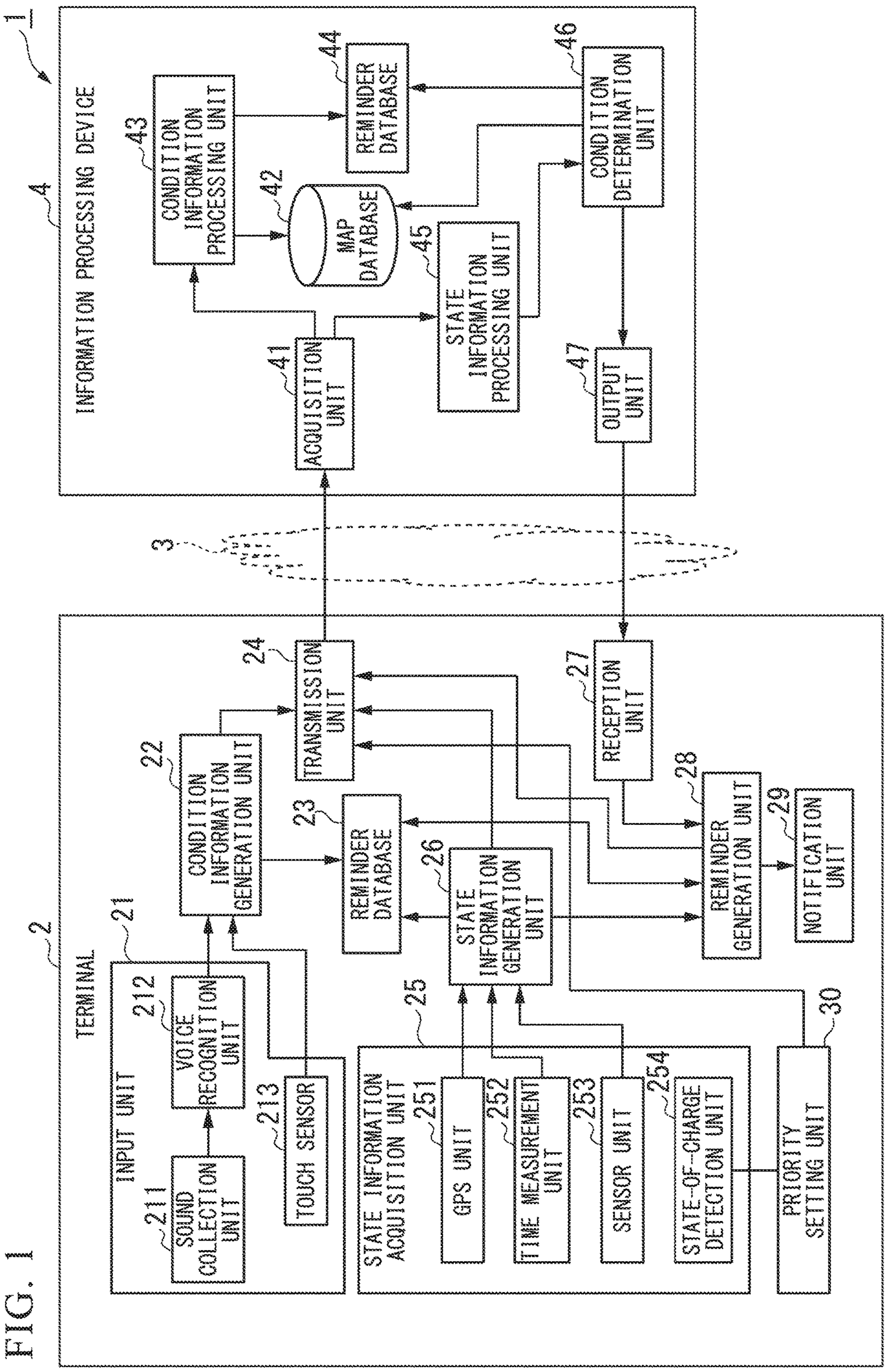
FIG. 1 is a block diagram illustrating a configuration of an information processing system according to a first embodiment.

FIG. 1 is a block diagram illustrating a configuration of an information processing system 1 according to the present embodiment. As illustrated in FIG. 1, the information processing system 1 includes a terminal 2 and an information processing device 4. The terminal 2 and the information processing device 4 exchange information via a network 3. The network 3 is, for example, the Internet using an Internet protocol (IP) as a communication protocol. Also, the network 3 may be configured to include, for example, a portable phone network, a wireless local area network (LAN), etc.

<Configuration of Terminal 2 and Configuration of Information Processing Device 4>

The terminal 2 includes an input unit 21, a condition information generation unit 22, a reminder database 23, a transmission unit 24, a state information acquisition unit 25, a state information generation unit 26, a reception unit 27, a reminder generation unit 28, a notification unit 29, and a timing control unit 30. The input unit 21 includes a sound collection unit 211, a voice recognition unit 212, and a touch sensor 213. The state information acquisition unit 25 includes a GPS unit 251, a time measurement unit 252, and a sensor unit 253.

The information processing device 4 includes an acquisition unit 41, a map database 42, a condition information processing unit 43, a reminder database 44, a state information processing unit 45, a condition determination unit 46, and an output unit 47.

<Function of Terminal 2>

First, the terminal 2 will be described. The terminal 2 is, for example, a smartphone, a tablet terminal, a portable game device, a vehicle, a robot, or the like having a communication function. In the present embodiment, an example in which the terminal 2 is a smartphone will be described.

The input unit 21 acquires notification condition information input by the user and outputs the acquired notification condition information to the condition information generation unit 22.

The sound collection unit 211 is a microphone. The sound collection unit 211 converts the collected voice signal into an electrical signal and outputs the converted voice signal to the voice recognition unit 212.

The voice recognition unit 212 calculates a voice feature quantity of the voice signal for each frame with respect to the voice signal output by the sound collection unit 211. The voice recognition unit 212 performs a voice recognition process using the calculated voice feature quantity and a voice recognition model stored in the unit itself. The voice recognition unit 212 determines a phrase having the highest likelihood calculated using the voice recognition model with respect to the calculated voice feature quantity as a recognition result. The voice recognition unit 212 outputs text data indicating the recognition result to the condition information generation unit 22. Here, the text data includes at least target position information (a first condition) indicating a target position and target time information (a second condition) indicating a scheduled target time at which predetermined behavior is performed at the target position. Also, the target position information is at least one of, for example, information indicating landmarks such as a station name, a building name, a shop name, and a park name and a place name. Also, the target time information includes information indicating a year/month/day and a time. Also, the voice recognition unit 212 may be configured to detect a speech section on the basis of, for example, a magnitude of an acoustic signal and perform a voice recognition process on a voice signal within the detected speech section.

The touch sensor 213 is a touch panel type sensor provided on an image display unit provided in the notification unit 29. The touch sensor 213 detects a result of an operation performed by a user of the terminal 2 and outputs detected result information indicating the detected result to the condition information generation unit 22. Here, the detected result information includes at least the target position information and the target time information.

The information acquired by the sound collection unit 211 or the touch sensor 213 is a condition for allowing the user to provide a notification of a reminder. Thus, in the following description, information including at least one of the target position information and the target time information is also referred to as notification condition information.

The condition information generation unit 22 acquires the notification condition information output by the input unit 21. That is, the condition information generation unit 22 acquires the text data output by the voice recognition unit 212 or the detected result information output by the touch sensor 213. The condition information generation unit 22 generates condition information on the basis of at least one of the target position information and the target time information included in the acquired text data or detected result information. Here, the condition information is at least one of the target position information and the target time information. The condition information generation unit 22 attaches an identifier for identifying the terminal 2 to the generated condition information and outputs the condition information to the transmission unit 24, and further writes the condition information to the reminder database 23 (a storage unit). Also, in the following description, an example in which the condition information is the target position information will be described. Also, information included in the condition information is assumed to be predetermined between the terminal 2 and the information processing device 4. For example, information desired to be processed by the information processing device 4 may be configured to be predetermined by a designer of the information processing system 1. Also, the identifier is, for example, an international mobile equipment identity (IMEI), a mobile equipment identifier (MEID), or the like of the terminal 2.

The reminder database 23 stores state information in association with the condition information. Also, an example of the information stored by the reminder database 23 will be described below.

The transmission unit 24 transmits the condition information to which the identifier output by the condition information generation unit 22 is attached to the information processing device 4 via the network 3. The transmission unit 24 transmits state information to which the identifier output by the state information generation unit 26 is attached to the information processing device 4 via the network 3. Also, it is only necessary to include at least current position information in the state information to be transmitted to the information processing device 4 by the transmission unit 24. The transmission unit 24 transmits execution information to which the identifier output by the reminder generation unit 28 is attached to the information processing device 4 via the network 3.

The state information acquisition unit 25 acquires detection information to be described below and outputs the acquired detection information to the state information generation unit 26.

The GPS unit 251 receives radio waves from a GPS satellite, acquires information of a position at which the terminal 2 is used on the basis of the received radio waves, and outputs the acquired position information as current position information to the state information generation unit 26. Here, the current position information is information based on target position information and is information in which coordinates of a current position are indicated by the latitude and the longitude thereof. Also, the GPS unit 251 may acquire the position information on the basis of communication with a base station (not illustrated). Also, the GPS unit 251 may be configured to extract a GPS time included in the received radio waves, calculate the current time on the basis of the extracted GPS time, and output current time information indicating the calculated current time to the state information generation unit 26. Also, the current time information is information based on the target time information.

The time measurement unit 252 acquires the current time through communication with the base station and outputs the current time information indicating the acquired current time to the state information generation unit 26. Also, the time measurement unit 252 may be configured to perform time measurement by counting a reference clock signal generated by the terminal 2 and output the measured time information as the current time information to the state information generation unit 26.

The sensor unit 253 is a sensor which detects the state of the terminal 2 and outputs sensor information detected by the sensor to the state information generation unit 26. The sensor unit 253 is, for example, at least one sensor of an acceleration sensor which detects the tilt or the like of the terminal 2, a luminance sensor which detects the luminance around the terminal 2, a temperature sensor which detects the temperature around the terminal 2, a humidity sensor which detects the humidity around the terminal 2, an atmospheric pressure sensor which detects the atmospheric pressure around the terminal 2, etc.

A state-of-charge detection unit 254 detects a state of charge in the terminal 2. Here, the state of charge in the terminal 2 includes the following concepts.

The terminal 2 of the present embodiment includes a rechargeable battery (a storage battery) as a power supply (not illustrated). The state of charge in the terminal 2 includes a capacity of the battery, i.e., an amount of power with which the battery is charged (or stored in the battery) at present. Also, the state of charge in the terminal 2 includes whether the battery is in a charged state.

Also, the GPS unit 251, the time measurement unit 252, and the sensor unit 253 acquire information at each of predetermined time intervals. Alternatively, the GPS unit 251, the time measurement unit 252, and the sensor unit 253 may be configured to acquire at least current time information when notification information is received from the information processing device 4.

At least the current position information and the current time information among the current position information output by the GPS unit 251, the current time information output by the time measurement unit 252, and the sensor information output by the sensor unit 253 are input to the state information generation unit 26. Also, the current position information, the current time information, and the sensor information are referred to as detection information. The state information generation unit 26 generates state information using the input detection information. Here, the state information is information including at least the current position information and the current time information. The state information generation unit 26 outputs the generated state information to the reminder generation unit 28. Also, the state information generation unit 26 attaches an identifier to the state information and outputs the state information to the transmission unit 24. Also, the state information generation unit 26 writes the generated state information to the reminder database 23. Also, the state information generation unit 26 may be configured to update the state information stored in the reminder database 23 and write, for example, only latest state information and immediately previous state information, to the reminder database 23.

The reception unit 27 receives the notification information transmitted by the information processing device 4 via the network 3 and outputs the received notification information to the reminder generation unit 28.

The reminder generation unit 28 determines whether the state information is input from the state information generation unit 26 within a first predetermined time period from the timing at which the reception unit 27 outputs the notification information. Here, the first predetermined time period is, for example, one minute. Also, the first predetermined time may be a value differing according to a movement speed of the terminal 2, weather, temperature, altitude, a current time, or the like. Also, the reminder generation unit 28 calculates the movement speed using, for example, first current position information at a first time and second current position information at a second time acquired from the GPS unit 251. Also, the reminder generation unit 28 may be configured to acquire information related to a weather or temperature of a current position from, for example, the Internet, via the network 3 using the reception unit 27. If it is determined that the state information has been input within a predetermined time period, the reminder generation unit 28 refers to condition information stored in the reminder database 23 and determines whether the current time is within a second predetermined time period including a target time. Alternatively, if it is determined that the state information has not been input within the predetermined time period, the reminder generation unit 28 reads the condition information and the latest state information stored in the reminder database 23 and determines whether the current time is within the second predetermined time period including the target time. Here the second predetermined time period is, for example, 5 minutes.

If the current time is within the second predetermined time period including the target time, the reminder generation unit 28 generates a reminder when determining that the current position is in the predetermined range including the target position and the current time is within the second predetermined time period including the target time. The reminder generation unit 28 outputs the generated reminder to the notification unit 29. Further, when the reminder is output to the notification unit 29, the reminder generation unit 28 attaches an identifier and target time information to execution information indicating that the reminder has been executed and outputs the execution information to the transmission unit 24.

The notification unit 29 provides a notification of the reminder output by the reminder generation unit 28 using at least one of an image, voice, vibration, etc. The notification unit 29 is configured to include an image display device, a voice output device, a vibration device, etc. The image display device is, for example, a liquid crystal display, the voice output device is, for example, a speaker, and the vibration device is, for example, a vibrator.

The timing control unit 30 changes a reminder determination timing according to the state of charge detected by the state-of-charge detection unit 254. The reminder determination timing in the present embodiment will be described below.

<Function of Information Processing Device 4>

Next, the information processing device 4 will be described. The information processing device 4 is, for example, a server.

The acquisition unit 41 is a reception unit and receives the condition information, the state information, or the execution information transmitted by the terminal 2 via the network 3. The acquisition unit 41 outputs the received condition information, state information, or execution information to the condition information processing unit 43 and the state information processing unit 45.

The map database 42 stores attribute information for each landmark in association with information for identifying the reminder. Here, the information for identifying the reminder is, for example, a station name of a railroad or the like, a building name, a park name, a square name, a facility name, a nickname or the like. Also, the attribute information of the landmark includes, for example, coordinates (latitude and longitude) of the landmark and an address of the landmark. The map database 42 may be configured to further store, for example, information of a premises diagram of a station of a railroad or the like and information of a premises diagram of a site constituted of a plurality of buildings (e.g., premises of a university). Also, the information processing device 4 may not include the map database 42 and the map database 42 may be connected to the information processing device 4 via the network 3.

The condition information processing unit 43 extracts condition information from the information output by the acquisition unit 41 and converts target position information included in the extracted condition information into coordinates (latitude and longitude) by referring to the map database 42. The condition information processing unit 43 writes the coordinates obtained through the conversion to the reminder database 44 in association with an identifier. Also, the condition information processing unit 43 may also be configured to write the target time information to the reminder database 44 in association with the above-described information if the target time information is included in the condition information.

The reminder database 44 associates and stores coordinates of a target position and a target date and time for each identifier. Also, an example of information stored by the reminder database 44 will be described below.

The state information processing unit 45 extracts the state information from the information output by the acquisition unit 41 and outputs the current position information included in the extracted state information to the condition determination unit 46. Also, the state information processing unit 45 extracts the execution information from the information output by the acquisition unit 41 and outputs the extracted execution information to the condition determination unit 46.

When the state information has been input from the state information processing unit 45, the condition determination unit 46 determines whether the current position information included in the state information is in a predetermined range with coordinates of a target position associated with the identifier as a center by referring to the reminder database 44. Also, the predetermined range will be described below. If it is determined that the current position is in the predetermined range, the condition determination unit 46 generates notification information indicating that the terminal 2 is located in the predetermined range and outputs the generated notification information to the output unit 47.

Also, when the execution information has been input from the state information processing unit 45, the condition determination unit 46 deletes the coordinates of the target position and the target time information associated with the identifier included in the execution information from the reminder database 44. Also, if coordinates of a plurality of target positions and target time information are associated and stored in the reminder database 44 for one identifier, the condition determination unit 46 deletes the coordinates of the target position and the target time information coincident with the target time information included in the execution information from the reminder database 44.

The output unit 47 is a transmission unit and the notification information output by the condition determination unit 46 is transmitted to the terminal 2 via the network 3.

Here, an example of condition information, an example of state information, and an example of information stored in the reminder database 44 will be described.

First, an example of the condition information will be described.

FIG. 2 is a diagram illustrating an example of condition information to which an identifier is attached according to the present embodiment. In the example illustrated in FIG. 2, for information to be transmitted to the information processing device 4, target position information and target time information are associated with the identifier.

Next, an example of the state information will be described.

FIG. 3 is a diagram illustrating an example of state information to which an identifier is attached according to the present embodiment. As illustrated in FIG. 3, for information to be transmitted to the information processing device 4, current position information, current time information, and sensor information are associated with the identifier.

Next, an example of information stored in the reminder database 44 will be described.

FIG. 4 is a diagram illustrating an example of information stored in the reminder database 44 of the information processing device 4 according to the present embodiment. Also, an example illustrated in FIG. 4 is an example in which the target position information and the target time information are included in the condition information. In the example illustrated in FIG. 4, for example, coordinates of AA building of Shibuya and "17:00 on Jul. 7, 2015" as the target time information are associated with the identifier ID1001

<Display Image Example of Terminal 2>

Next, an example of the display image displayed on the image display unit provided in the notification unit 29 of the terminal 2 will be described.

Figure 5:
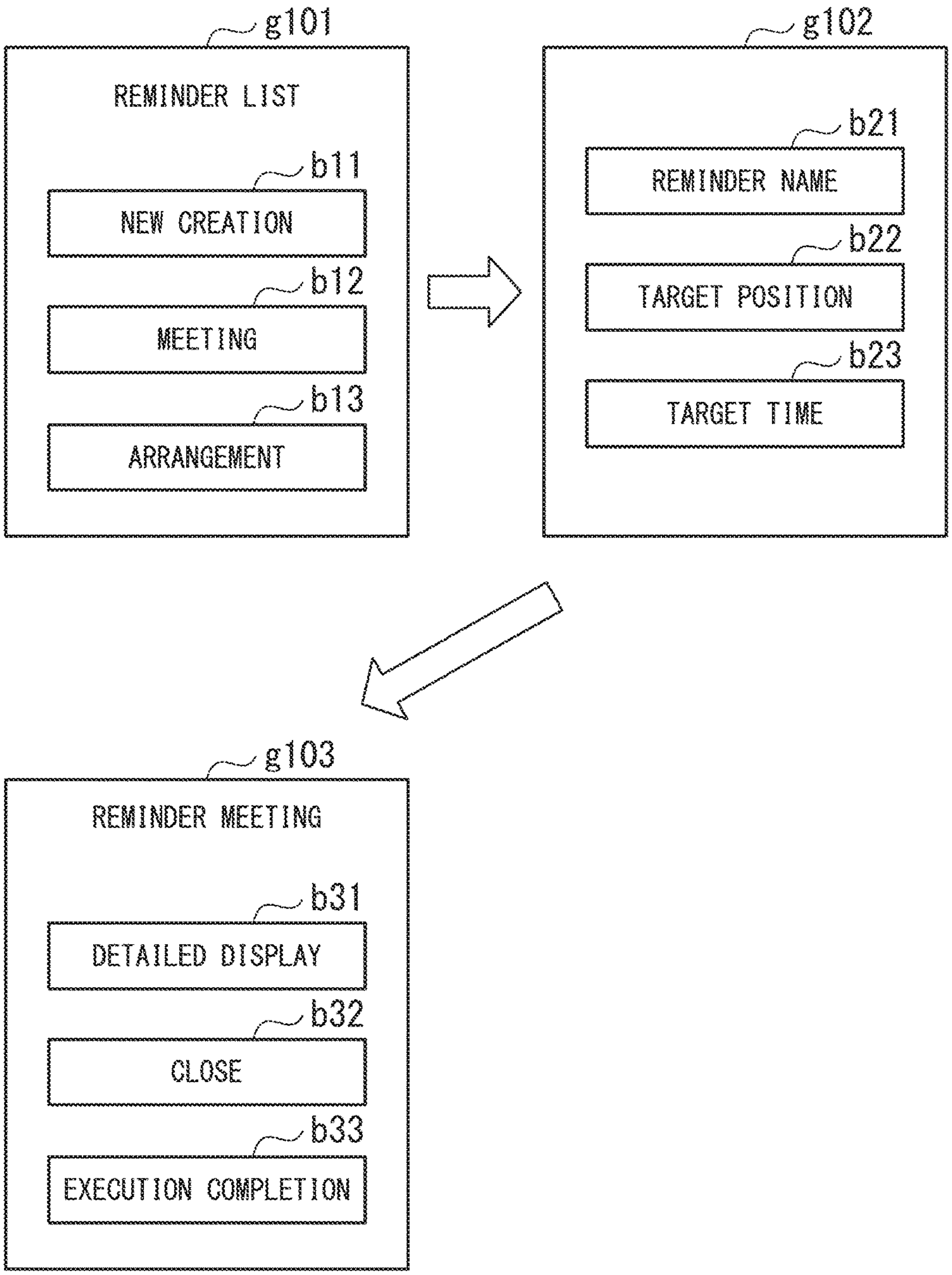
FIG. 5 is a diagram illustrating an example of a display image displayed on an image display unit provided in a notification unit of a terminal according to the first embodiment.

FIG. 5 is a diagram illustrating an example of a display image displayed on an image display unit provided in the notification unit 29 of the terminal 2 according to the present embodiment. An image indicated by reference numeral g101 of FIG. 5 is an example of a display image when notification condition information is registered. The display image includes an image b11 of a new creation button, an image b12 indicating a registered "meeting," and an image b13 indicating a registered "arrangement." When new notification condition information is registered, the user selects the image b11 of the new creation button. A selection result is detected by the touch sensor 213. Also, if the registered notification information is referred to or edited, the user selects, for example, the image b12 indicating the "meeting."

An image indicated by reference numeral g102 of FIG. 5 is an example of a display image when the image b11 of the new creation button is selected. The display image includes an image b21 of a button for editing a reminder name, an image b22 of a button for inputting a target position, and an image b23 of a button for inputting a target time. The user selects the image b21 of the button for editing the reminder name and selects or inputs a reminder name, for example, "shopping." The user selects the image b22 of the button for inputting the target position and inputs information related to the target position for registering a reminder, for example, a place name and a landmark name. The user selects the image b23 of the button for inputting the target time and selects or inputs a year/month and a time for registering the reminder.

An image indicated by reference numeral g103 of FIG. 5 is an example of a display image at the time of a notification of the reminder.

The display image includes an image b31 of a button for displaying details of the reminder, an image b32 of a button for closing a notification image of the reminder, and an image b33 of a button for confirming that the reminder has been executed. If the user desires to confirm detailed content of the registered reminder when a notification of the reminder is provided, the image b31 of the button for displaying the details of the reminder is selected. Thereby, information of the registered reminder name, target position, and target time is displayed. Also, if the user desires to iterate the notification after the notification of the reminder, the image b32 of the button for closing the notification image of the reminder is selected. Thereby, a condition registered by the terminal 2 and the information processing device 4 is checked again after, for example, 5 minutes, and the terminal 2 provides the notification of the reminder again if the condition is satisfied. Also, if the user desires to end the notification of the reminder after the notification of the reminder, the image b33 of the button for confirming that the reminder has been executed is selected. Thereby, the terminal 2 does not provide the notification related to the reminder thereafter.

Also, an example in which the user operates the touch sensor 213 to register notification condition information and a notification is provided from the image display unit provided in the notification unit 29 has been described in the example illustrated in FIG. 5, but the present invention is not limited thereto. The registration of the notification condition information may be performed by voice. Also, the notification unit 29 may be configured to provide the notification using voice or vibration. The user may select a type of notification by operating, for example, the touch sensor 213 or by voice.

<Example of Range of Position at which Information Processing Device 4 Detects Terminal 2>

Figure 6:
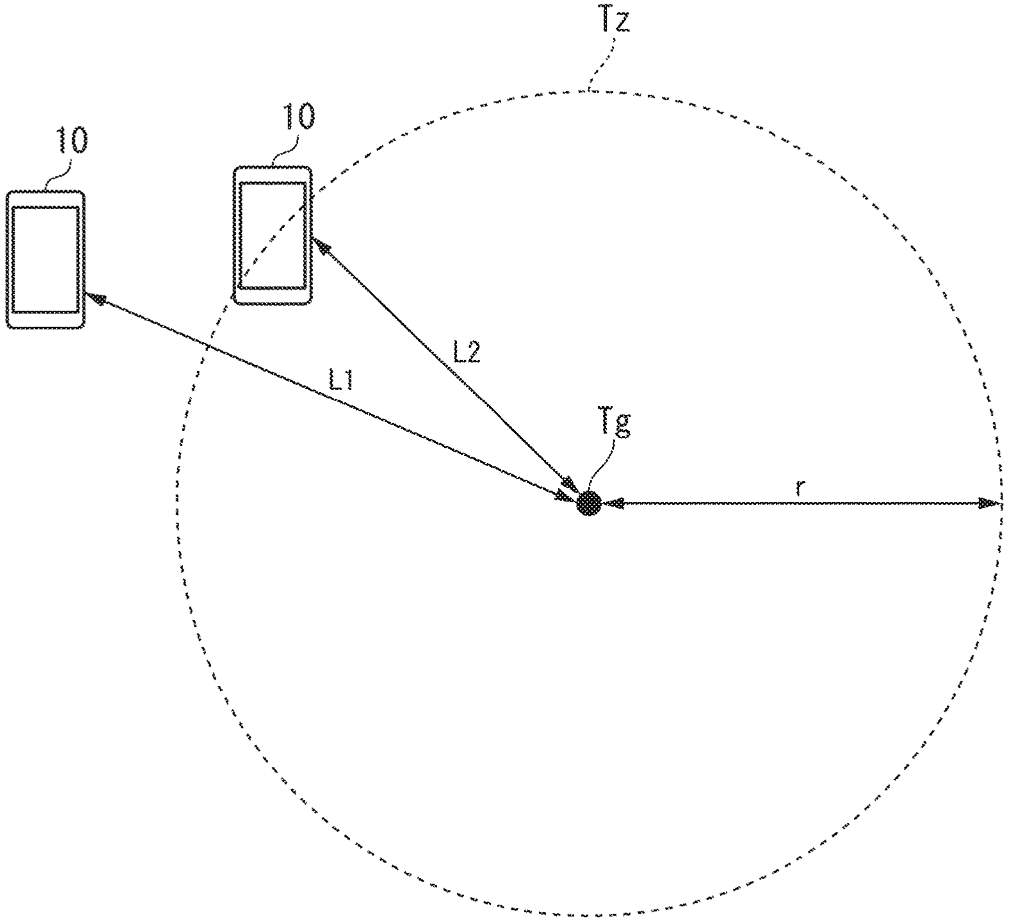
FIG. 6 is a diagram illustrating an example of a range of a position at which the information processing device detects the terminal according to the first embodiment.

Next, an example of a range of a position at which the information processing device 4 detects the terminal 2 will be described. FIG. 6 is a diagram illustrating an example of a range of a position at which the information processing device 4 detects the terminal 2 according to the present embodiment. In FIG. 6, reference numeral Tg indicates a target position. Also, a range indicated by a circle Tz of a dashed line is the above-described predetermined range. As illustrated in FIG. 6, the predetermined range is a range of a circle having a radius r with the target position Tg as a center. Also, a shape of a range illustrated in FIG. 6 is an example and the shape of the range is not limited to a circle and may be an ellipse, a rectangle, a polygon, a shape of station premises, or the like.

The information processing device 4 determines that the position of the terminal 2 is not in the predetermined range because a distance L1 is greater than the radius r in the case of the distance L1 from the target position Tg. Also, the information processing device 4 determines that the position of the terminal 2 is in the predetermined range because a distance L2 is less than the radius r in the case of the distance L2 (<L1) from the target position Tg.

<Process of Terminal 2 and Information Processing Device 4 Related to Reminder Notification>

A flow of a process to be cooperatively performed by the terminal 2 and the information processing device 4 in relation to the reminder notification of the present embodiment will be described with reference to the sequence diagram of FIG. 7.

(Step P101) First, the input unit 21 of the terminal 2 by which the user operates the terminal 2 and inputs notification condition information including a target position and a target time acquires the input notification condition information.

(Step P102) In the terminal 2, the condition information generation unit 22 generates the condition information on the basis of the acquired notification condition information and the transmission unit 24 transmits the condition information to which the identifier is attached to the information processing device 4. At this time, the condition information generation unit 22 writes the generated condition information to the reminder database 23.

(Step P103) The state information acquisition unit 25 of the terminal 2 acquires detection information. The state information generation unit 26 of the terminal 2 generates state information according to the condition information using the acquired detection information. Also, if the condition information is target position information, the state information according to the condition information is current position information. Subsequently, the state information generation unit 26 transmits the state information to which the identifier is attached to the information processing device 4 through the transmission unit 24. Also, the state information generation unit 26 may transmit the condition information along with the state information to the information processing device 4 through the transmission unit 24. Also, the state information generation unit 26 outputs the generated state information to the reminder generation unit 28.

(Step P104) In the information processing device 4, the state information transmitted from the terminal 2 as described above is acquired by the acquisition unit 41. The state information processing unit 45 inputs the state information acquired by the acquisition unit 41 to the condition determination unit 46.

The condition determination unit 46 determines whether a trigger condition is satisfied with reference to the reminder database 44 according to an input of the state information. Also, the trigger condition here is whether current position information included in the state information is in a predetermined range with coordinates of the target position associated with an identifier as a center.

(Step P105) The condition determination unit 46 generates notification information indicating that the terminal 2 is in the predetermined range if it is determined that the trigger condition is satisfied and transmits the notification information to the terminal 2. If it is determined that the trigger condition is not satisfied, the condition determination unit 46 does not transmit the notification information.

(Step P106) The notification information transmitted in step P105 is received by the reception unit 27 of the terminal 2. According to the reception of the notification information, the reminder generation unit 28 determines whether the trigger condition is satisfied. That is, the reminder generation unit 28 determines whether the current time is within a predetermined time (a second predetermined time) including a target time.

(Step P107) If it is determined that the trigger condition is satisfied, the reminder generation unit 28 generates a reminder. The notification unit 29 provides a notification of the reminder output by the reminder generation unit 28 using at least one of an image, voice, vibration, etc.

(Step P107) The reminder generation unit 28 transmits execution information to which an identifier and target time information are attached to the information processing device 4 through the transmission unit 24 according to an output of the reminder to the reminder notification unit 29. That is, the execution information provides a notification indicating that the notification of the reminder has been executed by the terminal 2.

<Example of Reminder Determination Timings>

Next, the reminder determination timings set in the terminal 2 of the present embodiment will be described with reference to FIG. 8.

After the notification condition information is input by the user, the condition information generation unit 22 generates condition information using the target position information and the target time information included in the input notification condition information and transmits the generated condition information to the information processing device 4 at a time t1.

After the condition information is transmitted at the time t1, the terminal 2 performs the reminder determination process at each reminder determination cycle.

That is, at a time t2 at which a certain time has elapsed from the time t1, the state information generation unit 26 of the terminal 2 acquires current position information from the GPS unit 251 and the transmission unit 24 transmits the acquired condition information including the current position information to the information processing device 4.

Figure 7:
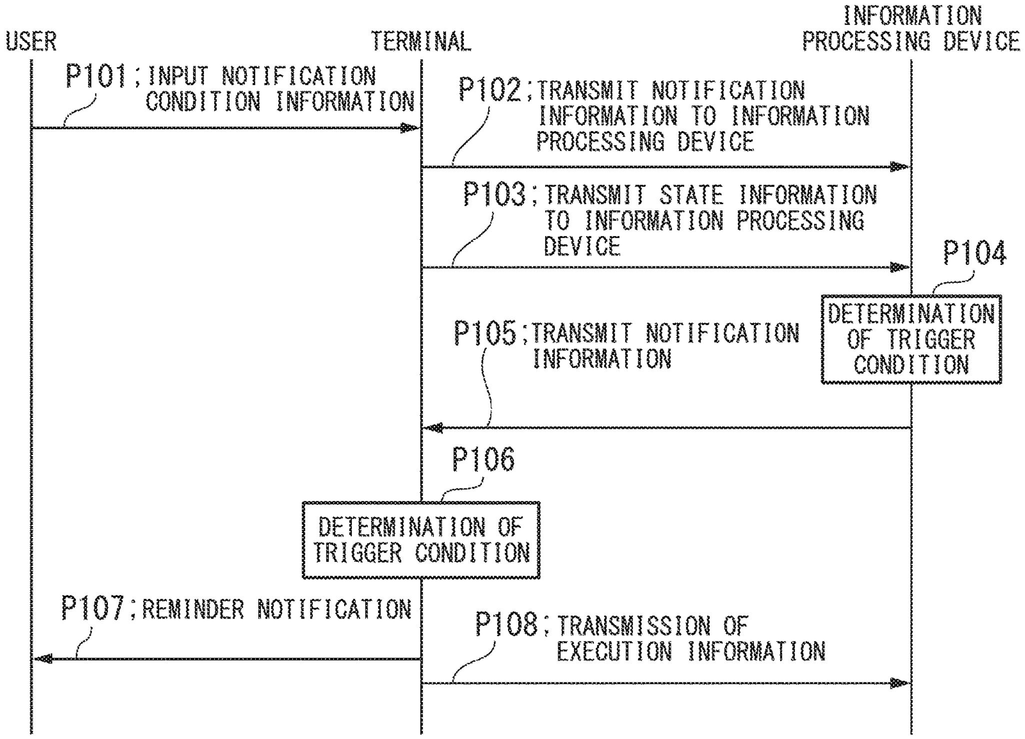
FIG. 7 is a sequence diagram illustrating an example of a processing procedure to be performed by the terminal and the information processing device in relation to the reminder notification according to the first embodiment.

The information processing device 4 transmits the notification information if it is determined that the trigger condition is satisfied in relation to the current position of the terminal 2 as indicated in steps P104 and P105 of FIG. 7 in response to reception of the condition information.

Therefore, the reception unit 27 of the terminal 2 awaits the reception of the notification information from the time t2 at which the condition information has been transmitted to a time t3 at which a fixed reception waiting time period TW has elapsed. In FIG. 7, a case in which the notification information has not been received in the reception waiting time period TW from the time t2 to the time t3 is illustrated. In this case, the terminal 2 does not perform the determination of the trigger condition related to the current time indicated as step P106 of FIG. 7 and therefore the terminal 2 also does not perform the notification of the reminder and the transmission of the execution information indicated as steps P107 and P108 of FIG. 7.

As described above, if the notification information has not been received in the reception waiting time period TW, the terminal 2 awaits the transmission of the state information from the time t3 to a time t4 at which the current reminder determination cycle T ends.

If the time t4 is reached, the next reminder determination cycle T starts. Therefore, at the time t4, the terminal 2 performs the acquisition of the current position information and the transmission of the state information and awaits the reception of the notification information from the time t4 to a time t5 at which the current reception waiting time period TW elapses. In FIG. 8, a case in which the notification information has not been received even in the reception waiting time period TW from the time t4 to a time t5 is illustrated. Therefore, in this case, the transmission of the state information is awaited until a time t6 at which the current reminder determination cycle T ends after the time t5.

If the time t6 is reached, the next reminder determination cycle T is started. Therefore, at the time t6, the terminal 2 performs the acquisition of the current position information and the transmission of the state information and starts to await the reception of the notification information based on the reception waiting time period TW.

Figure 8:
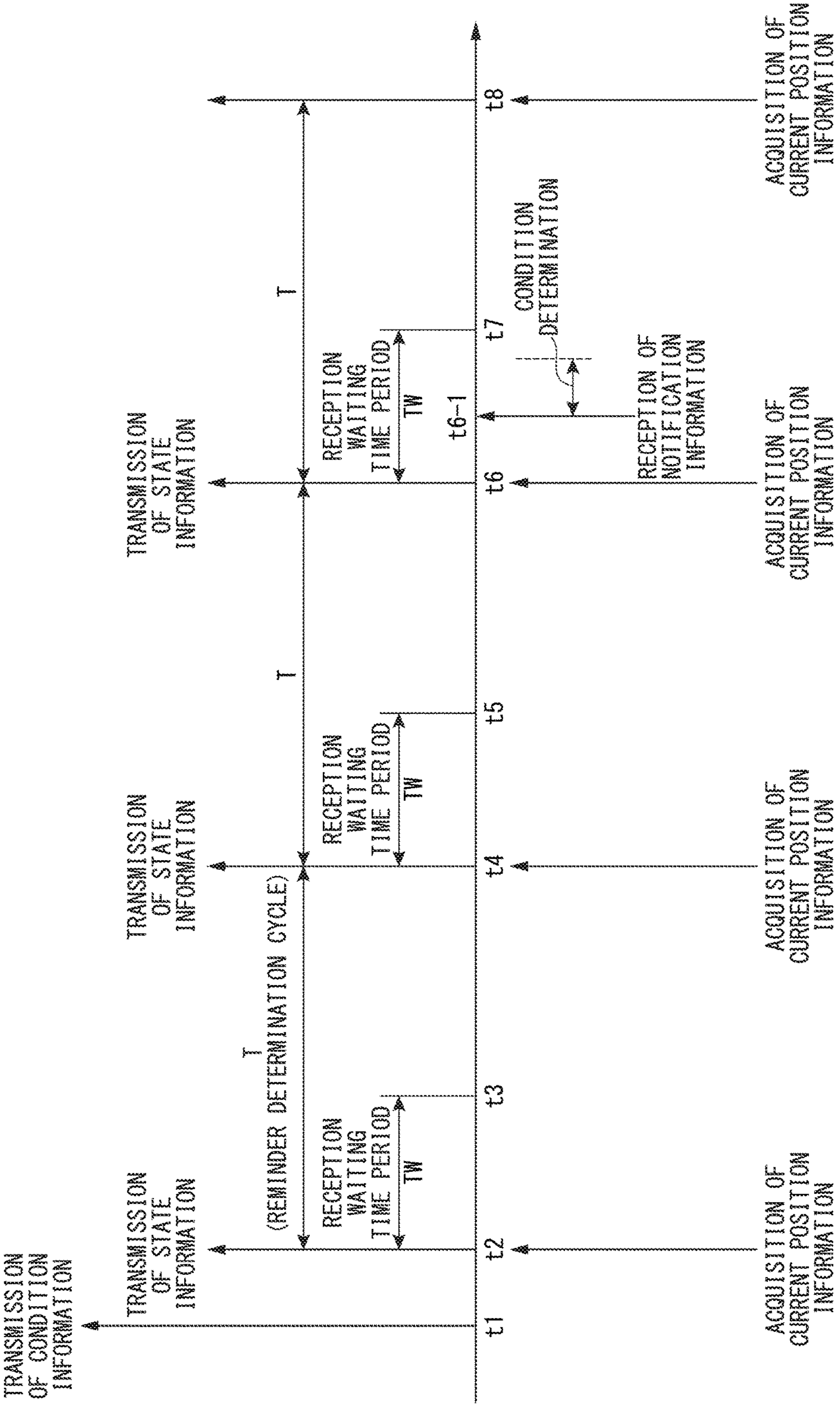
FIG. 8 is a timing chart illustrating an example of reminder determination timings according to the first embodiment.

In FIG. 8, a case in which the notification information has been received at a time t6-1 in the reception waiting time period TW from the time t6 to a time t7 is illustrated. According to the reception of the notification information, the terminal 2 executes the determination of the trigger condition related to the current time indicated as step P106 of FIG. 7 at the time t6-1. If it is determined that a result of determining the trigger condition indicates that the trigger condition is satisfied, the terminal 2 executes the notification of the reminder and the transmission of the execution information indicated as steps P107 and P108 of FIG. 7.

On the other hand, if it is determined that the result of determining the trigger condition indicates that the trigger condition is not satisfied, the terminal 2 does not execute the notification of the reminder and the transmission of the execution information indicated as steps P107 and P108 of FIG. 7. The transmission of the state information is awaited until a time t8 at which the current reminder determination cycle T ends and the transmission of the state information and the reception waiting based on the reception waiting time period TW start according to a start of the next reminder determination cycle T at the time t8.

As described above, in the present embodiment, the terminal 2 performs the following process related to the determination of whether to provide a notification of the reminder in each reminder determination cycle T until the notification of the reminder is performed.

That is, a state information transmission process of acquiring the current position and transmitting the state information and a reception waiting process of awaiting the reception of the notification information transmitted from the information processing device 4 as a response for the transmission of the state information across the reception waiting time period TW are performed. Further, if the state information has been received within the reception waiting time period TW, a trigger condition determination process of determining whether the trigger condition related to the current time is satisfied is further performed.

Also, the above-described state information transmission process, reception waiting process, and trigger condition determination process are collectively referred to as a reminder determination-related process.

The reminder determination timing in the present embodiment specifically corresponds to the reminder determination cycle T illustrated in FIG. 8. That is, the reminder determination timing in the present embodiment is the timing at which the state information transmission process and the reception waiting process start at each time interval corresponding to the reminder determination cycle T.

<Reminder Determination Timing Control in Present Embodiment>

The terminal 2 including a reminder notification function of the present embodiment is, for example, a smartphone, i.e., a portable type, and it is usual to generally drive the terminal 2 with a rechargeable battery. Thus, it is preferable to lengthen duration of the battery as much as possible. However, because a part of the reminder notification process is imposed on the terminal 2 and the power consumption thereof increases in the case of the present embodiment, this becomes a factor which shortens the duration of the battery. According to this viewpoint, it is preferable to reduce the power consumption of the terminal 2 on which the part of the reminder notification process is imposed.

As illustrated in FIG. 7, the reminder determination-related process is periodically executed at each reminder determination cycle T. That is, the terminal 2 necessarily executes the state information transmission process and the reception waiting process at each time interval corresponding to the reminder determination cycle T. Thus, in the terminal 2, power consumption is caused by the periodically performed state information transmission process and reception waiting process. Further, if the notification information is received in the reception waiting time period TW, the trigger condition determination process is further executed in the reminder determination cycle T and power consumption due to the trigger condition determination process is caused.

The following is described in relation to the power consumption due to the reminder determination-related process performed at each reminder determination cycle T. That is, when the reminder determination cycle T is shorter, the reminder determination cycle T included in a unit time is longer and the number of times of execution of the reminder determination-related process is also larger. Accordingly, the power consumption due to the reminder determination-related process in a unit time increases. On the other hand, when the reminder determination cycle T is longer, the reminder determination cycle T included in a unit time is shorter and the number of times of execution of the reminder determination-related process is also smaller. Accordingly, the power consumption in the unit time due to the reminder determination-related process decreases.

If the power consumption due to the reminder determination-related process decreases when the capacity of the battery has decreased, it is possible to suppress the decrease of the capacity of the battery and lengthen the duration of the battery.

Therefore, in the present embodiment, the reminder determination timing is controlled so that the reminder determination cycle T changes according to the state of charge of the battery.

Specifically, the terminal 2 performs setting so that the reminder determination cycle T lengthens step by step according to the reduction of the capacity (the remaining capacity) of the battery.

However, for example, even when the timing at which it is necessary to change the reminder determination cycle to a longer cycle is reached, for example, the accuracy of a reminder notification may be prioritized according to a situation of the user at that time. Because the accuracy of the notification of the reminder is higher when the reminder determination cycle T is shorter, it is not preferable to change the reminder determination cycle to a longer cycle for the user in such a case.

Therefore, the terminal 2 suspends control for changing the reminder determination cycle T and first displays a timing change confirmation screen to the user if it is necessary to change the reminder determination cycle T to a longer cycle according to the decrease of the capacity of the battery. The timing change confirmation screen is a dialog screen for allowing the user to confirm whether it is necessary to lengthen the reminder determination cycle T due to the timing at which it is necessary to shorten the reminder determination cycle T according to the decrease of the capacity of the battery being reached.

The user can perform an operation of designating approval or rejection for a change of the reminder determination cycle T to a time period longer than the current period with respect to the timing change confirmation screen.

If the operation of designating the approval of the change of the reminder determination cycle T has been performed, the terminal 2 makes a change so that the reminder determination cycle T is designated as a time period determined on the basis of the capacity of the battery. On the other hand, if the operation of designating the rejection of the change of the reminder determination cycle T has been performed, the terminal 2 does not change the reminder determination cycle T.

In the present embodiment as described above, when the reminder determination cycle T is changed to a longer cycle, consideration is given so that it is not difficult to use the reminder function by taking into account the user's intention.

Hereinafter, a configuration example for implementing reminder determination timing control of the above-described present embodiment will be described.

A part for performing reminder determination timing control in the terminal 2 of the present embodiment is the timing control unit 30. The timing control unit 30 first acquires the capacity of the battery as the state of charge of the battery at the time of the reminder determination timing control. The timing control unit 30 determines the number of simultaneously activatable applications (a reminder determination cycle) on the basis of the acquired capacity of the battery. Hereinafter, this point will be described.

Figures 9, 10:
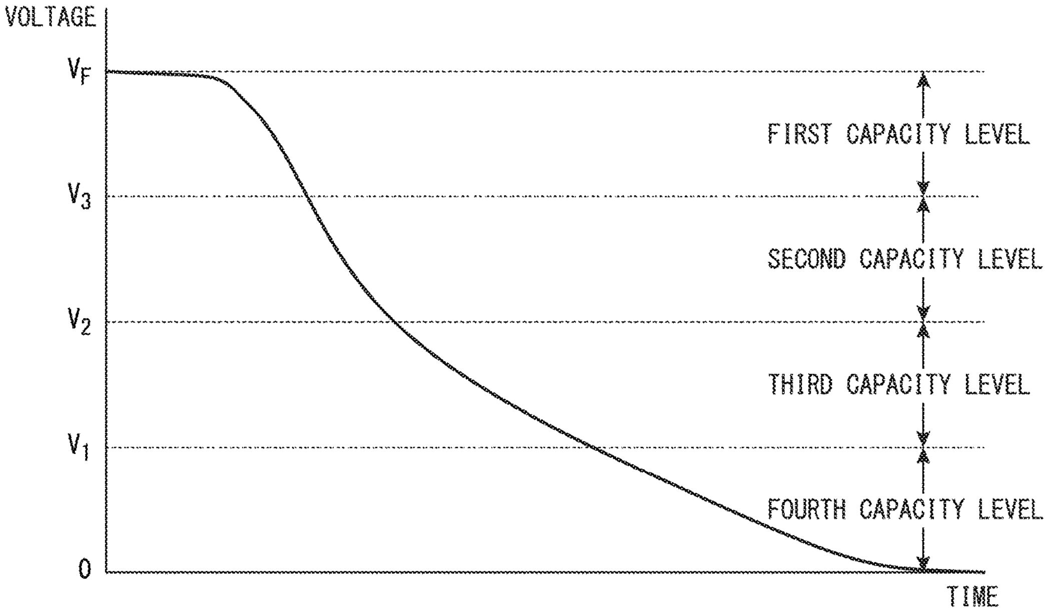
FIG. 9 is a diagram illustrating an example of change in a voltage (a battery voltage) according to passage of time in a battery provided in the terminal according to the first embodiment.
FIG. 10 is a diagram illustrating an example of a reminder determination cycle table according to the first embodiment.

The capacity of the battery is shown as a change in the voltage of the battery. FIG. 9 illustrates an example of change in the voltage of the battery (the battery voltage) according to the passage of time when the battery is continuously used according to a certain fixed output. In this case, the capacity decreases according to the passage of time because the battery continuously outputs power. According to FIG. 9, the battery voltage decreases according to the passage of time. That is, a change is made so that the battery voltage also decreases when the capacity of the battery decreases. Also, the capacity of the battery uniquely corresponds to the battery voltage.

Therefore, the state-of-charge detection unit 254 in the present embodiment detects the battery voltage to detect the capacity of the battery. The timing control unit 30 inputs the battery voltage detected by the state-of-charge detection unit 254.

In the present embodiment, a range from a battery voltage $V_F$ corresponding to a fully charged state to 0 V is set so that the range is divided into four capacity levels of first to fourth capacity levels in descending order of a battery voltage. The first capacity level is a range from the battery voltage $V_F$ to a battery voltage $V_3$, the second capacity level is a range from the battery voltage $V_3$ to a battery voltage $V_2$, the third capacity level is a range from the battery voltage $V_2$ to a battery voltage $V_1$, and the fourth capacity level is a range from the battery voltage $V_1$ to 0 V.

Also, values serving as the battery voltages $V_1$, $V_2$, and $V_3$ may be set on the basis of characteristics of a correspondence relationship between the battery voltage and the duration of the battery and the like. Accordingly, an example in which the voltage range from the battery voltage $V_F$ to 0 V is divided into four equal parts in correspondence with the first to fourth capacity levels is illustrated in FIG. 9, but voltage value intervals corresponding to the capacity levels need not be equal. Also, the number of capacity levels is not limited to four as illustrated in FIG. 9.

The timing control unit 30 determines any one of the first to fourth capacity levels corresponding to a battery voltage input from the state-of-charge detection unit 254. Next, the timing control unit 30 determines the reminder determination cycle T corresponding to the determined capacity level.

The reminder database 23 stores the reminder determination cycle table. FIG. 10 illustrates an example of the reminder determination cycle table. The reminder determination cycle table of FIG. 10 is a structure in which time lengths serving as different reminder determination cycles $T_1$, $T_2$, $T_3$, and $T_4$ correspond to the first capacity level, the second capacity level, the third capacity level, and the fourth capacity level.

Here, the reminder determination cycles $T_1$, $T_2$, $T_3$, and $T_4$ have a relationship of $T_1<T_2<T_3<T_4$.

The timing control unit 30 determines any one of the reminder determination cycles $T_1$, $T_2$, $T_3$, and $T_4$ corresponding to the reminder determination cycle T corresponding to the determined capacity level by referring to the reminder determination cycle table. As a specific example, if it is determined that the capacity level is the second capacity level, the timing control unit 30 acquires the reminder determination cycle $T_2$ associated with the second capacity level from the reminder determination cycle table. As described above, the timing control unit 30 determines the reminder determination cycle T.

If the reminder determination cycle T is determined, the timing control unit 30 compares time lengths of the current reminder determination cycle T and the determined reminder determination cycle $T_i$ (i=1, 2, 3, 4). If the comparison result indicates that the time lengths of the current reminder determination cycle T and the determined reminder determination cycle $T_i$ are the same, the timing control unit 30 determines that it is unnecessary to change the reminder determination cycle T. On the other hand, if one of the time lengths of the current reminder determination cycle T and the determined reminder determination cycle $T_i$ is longer or shorter, the timing control unit 30 determines that it is necessary to change the current reminder determination cycle T to the currently determined reminder determination cycle $T_i$.

If it is necessary to change the reminder determination cycle T to a longer cycle as in a case in which it is determined that it is necessary to change the reminder determination cycle T as described above, the timing control unit 30 displays the timing change confirmation screen as a screen of a reminder application.

Figure 11:
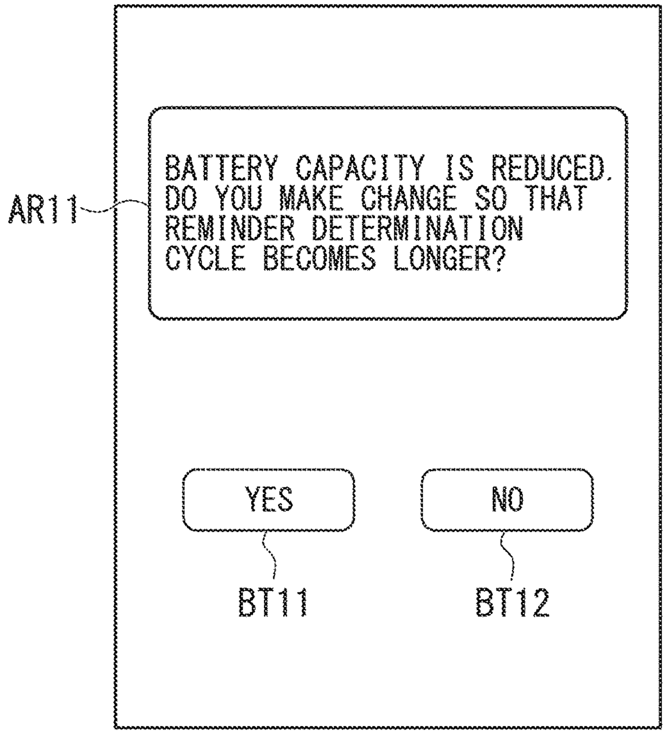
FIG. 11 is a diagram illustrating an example of a timing change confirmation screen according to the first embodiment.

FIG. 11 illustrates an example of the timing change confirmation screen. The timing change confirmation screen is a screen for providing a notification indicating that a timing at which it is necessary to change the reminder determination cycle T according to a decrease of the battery capacity has been reached to the user and allowing the user to confirm whether to change the reminder determination cycle T. Also, in the description here, an example of an operation of a case in which the image display unit provided in the notification unit 29 is configured as a touch panel in combination with the touch sensor 213 is included.

In the timing change confirmation screen of FIG. 11, a message area AR11 is arranged. The message area AR11 is an area for notifying the user that a state in which it is necessary to make a change so that the reminder determination cycle T becomes longer has been reached because the capacity of the battery has decreased and displaying a message for asking the user to confirm whether or not to change the reminder determination cycle T.

Also, when the timing change confirmation screen is displayed, the terminal 2 may provide a notification for the user using, for example, a sound, vibration, or the like.

The user viewing the timing change confirmation screen of FIG. 11 can ascertain that a situation in which it is necessary to make a change so that the reminder determination cycle T is long has been reached because the capacity of the battery has decreased. In addition, the user determines whether to make a change so that the reminder determination cycle T is long from, for example, his/her situation at the present.

If the user determines to make a change so that the reminder determination cycle T is long, a touch operation is performed on a "yes" button BT11 arranged in the timing change confirmation screen to take into account the intention for approving the change of the reminder determination cycle T. If the touch operation is performed on the "yes" button BT11, the timing control unit 30 in the terminal 2 performs control so that the reminder determination cycle T is changed to the currently determined reminder determination cycle $T_i$.

Thereby, because the reminder determination cycle T is set to be longer than the current cycle thereafter, the number of times of execution of the reminder determination-related process per unit time is reduced. As a result, power consumption of the execution of the reminder determination-related process can be reduced and the duration of the battery can be lengthened.

On the other hand, if the user does not determine to make a change so that the reminder determination cycle T is longer, a touch operation is performed on a "no" button BT12 arranged in the timing change confirmation screen to take into account the intention for rejection of the change of the reminder determination cycle. If the touch operation is performed on the "no" button BT12, the terminal 2 maintains the current reminder determination cycle T without changing it.

In this case, the power consumption of the execution of the reminder determination-related process is not reduced, but the accuracy of the reminder notification is maintained because the reminder determination-related process is executed according to the reminder determination cycle as desired by the user.

Also, for example, if the battery capacity is increased by charging the battery and the timing control unit 30 determines that it is necessary to make a change so that the reminder determination cycle T is shortened, control is performed as follows. In this case, because the accuracy of the reminder notification is increased by shortening the reminder determination cycle T in a state in which there is a surplus in the battery capacity, it can be regarded that a situation especially unfavorable to the user does not occur. Therefore, in this case, the timing control unit 30 performs control for making a change so that the reminder determination cycle T is shortened without especially providing the notification based on display of the timing change confirmation screen or the like to the user.

<Example of Processing Procedure of Terminal 2>

A processing procedure to be performed by the terminal 2 in the present embodiment will be described with reference to the flowcharts of FIGS. 12 to 14.

Figure 12:
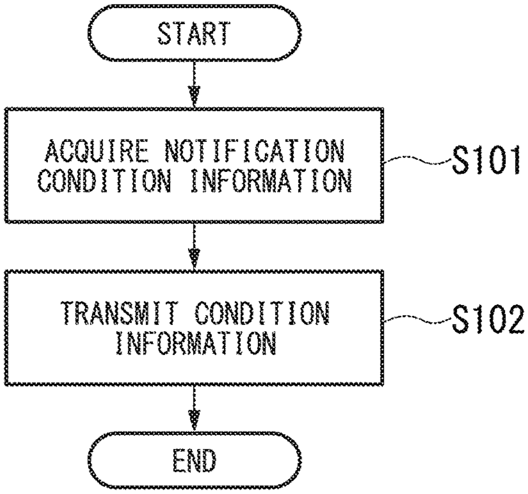
FIG. 12 is a flowchart illustrating an example of a processing procedure in which the terminal transmits condition information to the information processing device according to setting of a reminder according to the first embodiment.
Figure 13:
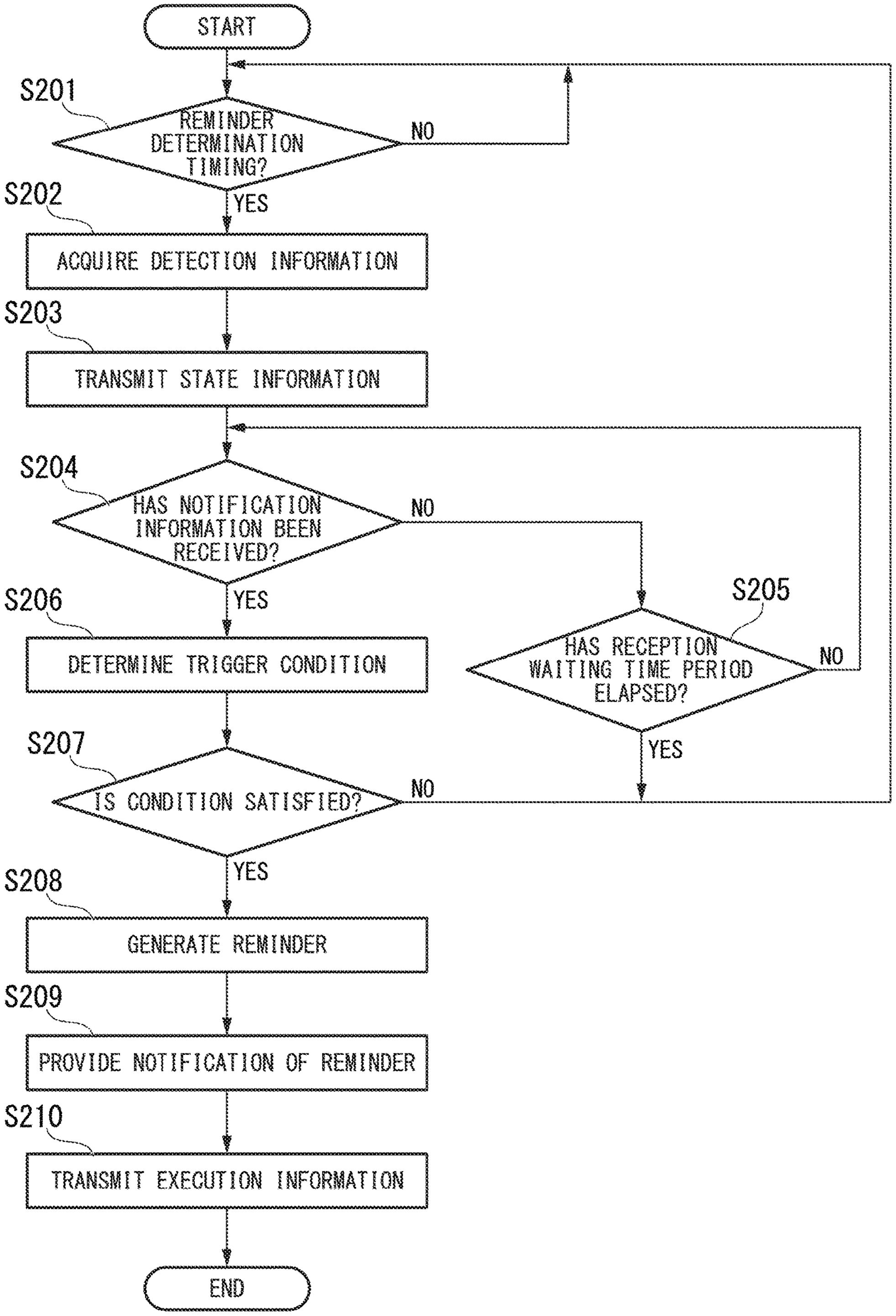
FIG. 13 is a flowchart illustrating an example of a processing procedure to be executed by the terminal for a reminder notification after the condition information is transmitted according to the first embodiment.

The flowchart of FIG. 12 shows a processing procedure in which the terminal 2 transmits condition information to the information processing device 4 according to setting of a reminder.

(Step S101) When the user inputs notification condition information including a target position and a target time by operating the terminal 2, the input unit 21 acquires the input notification condition information.

(Step S102) The condition information generation unit 22 generates condition information on the basis of the acquired notification condition information and transmits the condition information to which an identifier is attached to the information processing device 4 through the transmission unit 24. At this time, the condition information generation unit 22 writes the generated condition information to the reminder database 23.

Next, an example of a processing procedure to be performed by the terminal 2 for a reminder notification after the condition information is transmitted will be described with reference to the flowchart of FIG. 13.

(Step S201) The state information acquisition unit 25 waits for the reminder determination timing according to the reminder determination cycle T to be reached.

(Step S202) If the reminder determination timing is reached, the state information acquisition unit 25 acquires detection information.

(Step S203) The state information generation unit 26 generates state information according to the condition information using the acquired detection information. Also, when the condition information is target position information, the state information according to the condition information is current position information. Subsequently, the state information generation unit 26 transmits the state information to which the identifier is attached to the information processing device 4 through the transmission unit 24. Also, the state information generation unit 26 may transmit the condition information along with the state information to the information processing device 4 through the transmission unit 24. Also, the state information generation unit 26 outputs the generated state information to the reminder generation unit 28.

(Step S204) The reception unit 27 determines whether the notification information has been received. The process proceeds to the process of step S206 when the reception unit 27 determines that the notification information has been received (step S204; YES) and the process proceeds to the process of step S205 when the reception unit 27 determines that the notification information has not been received (step S204; NO).

(Step S205) The reception unit 27 determines whether the reception waiting time period TW has elapsed. Also, if it is determined that the reception waiting time period TW has not elapsed (step S205; NO), the reception unit 27 returns to the determination process in step S204. That is, a reception waiting process corresponding to the reception waiting time period TW continues.

On the other hand, if it is determined that that the reception waiting time period TW has elapsed (step S205; YES), the reception waiting time period TW is determined to have elapsed without reception of the notification information. Therefore, in this case, the reception unit 27 returns the process to step S201. In this case, the terminal 2 does not execute the processes of steps S206 to S210. That is, in this case, the terminal does not perform the trigger condition determination process and the reminder notification-related process.

(Step S206) If the notification information is received (step S204; YES), the reminder generation unit 28 determines whether the trigger condition is satisfied. That is, the reminder generation unit 28 determines whether a current time is included in a predetermined time range including a target time.

(Step S207) If the reminder generation unit 28 determines that the determination result of step S206 indicates that the trigger condition is satisfied (step S207; YES), it proceeds to the process of step S208. On the other hand, if it is determined that the trigger condition is not satisfied (step S207; NO), the reminder generation unit 28 returns the process to step S201. In this case, the terminal 2 does not execute the reminder notification-related process in steps S208 to S210.

(Step S208) The reminder generation unit 28 generates a reminder by determining that the current position is in the predetermined range including the target position and the current time is within the predetermined time period including the target time.

(Step S209) The notification unit 29 provides a notification of the reminder output by the reminder generation unit 28.

(Step S210) When the reminder has been output to the notification unit 29, the reminder generation unit 28 transmits execution information to which an identifier and target time information are attached to the information processing device 4 through the transmission unit 24.

As described above, the terminal 2 executes the state information transmission process and the reception waiting process every time the reminder determination timing corresponding to the reminder determination cycle T is reached until the reminder notification is executed and further executes the trigger condition determination process if the notification information has been received.

In addition, the timing control unit 30 sets (changes) the reminder determination cycle T which determines the reminder determination timing serving as a determination target in step S201 as follows.

Figure 14:
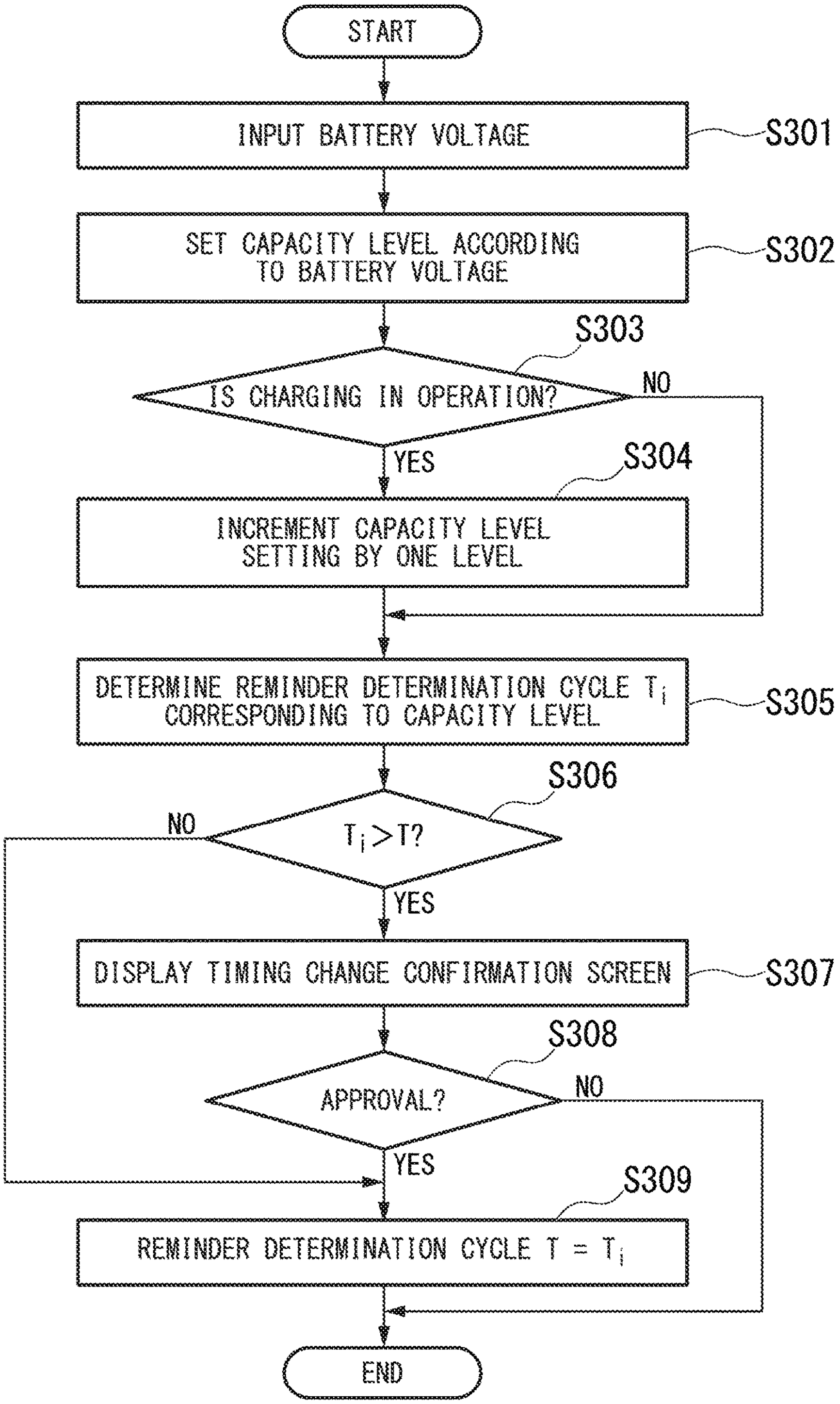
FIG. 14 is a flowchart illustrating an example of a processing procedure to be executed by the terminal for setting the reminder determination cycle according to the first embodiment.

The flowchart of FIG. 14 shows a processing procedure to be executed by the terminal 2 of the present embodiment to set the reminder determination cycle T. Also, the process of FIG. 14 is executed at each fixed time interval which is shorter than the shortest reminder determination cycle $T_1$.

(Step S301) The timing control unit 30 of the terminal 2 inputs a battery voltage as a state of charge detected by the state-of-charge detection unit 254.

(Step S302) The timing control unit 30 sets, for example, any capacity level of the first to fourth capacity levels illustrated in FIG. 10, according to the battery voltage input in step S301.

(Step S303) Next, the timing control unit 30 determines whether the battery is currently being charged. The state-of-charge detection unit 254 also detects whether the battery is being charged as the state of charge. The timing control unit 30 can perform the determination of step S303 on the basis of a detection result of the state-of-charge detection unit 254 regarding whether the battery is being charged.

(Step S304) If it is determined that the battery is being charged (step S303; YES), the timing control unit 30 increments the capacity level set in step S302 by one level. As a specific example, if the third capacity level is set in step S302, the timing control unit 30 changes the setting to the second capacity level which is one level higher than the third capacity level in step S304.

When the battery is being charged, a battery capacity after the present is higher than the current battery capacity and a surplus is likely to occur. Therefore, if the capacity level is incremented by one level in step S304, it is possible to take into account a state in which the surplus occurs in the battery capacity in the setting of the capacity level as described above.

On the other hand, if it is determined that the battery is not being charged (step S303; NO), step S304 is skipped. In this case, the result set in step S302 is used as the capacity level.

(Step S305) The timing control unit 30 determines the reminder determination cycle $T_i$ corresponding to the set capacity level by referring to the reminder determination cycle table stored by the reminder database 23.

(Step S306) The timing control unit 30 determines whether the reminder determination cycle $T_i$ determined in step S305 is longer than the current reminder determination cycle T.

(Step S307) If the reminder determination cycle $T_i$ determined in step S305 is longer than the current reminder determination cycle T (step S306; YES), the timing control unit 30 causes the timing change confirmation screen to be displayed.

(Step S308) The timing control unit 30 determines whether an operation of approving the change of the reminder determination cycle T has been performed as an operation on the timing change confirmation screen.

(Step S309) If the reminder determination cycle $T_i$ determined in step S305 is less than or equal to the current reminder determination cycle T (step S306; NO) or if the operation of approving the change of the reminder determination cycle T has been performed (step S308; YES), the timing control unit 30 executes the following process. That is, the timing control unit 30 changes the current reminder determination cycle T to the reminder determination cycle $T_i$ determined in step S305.

In addition, if an operation of rejecting the change of the reminder determination cycle T has been performed as the operation on the timing change confirmation screen (step S308; NO), the timing control unit 30 ends the process of FIG. 14 by skipping step S309. That is, in this case, the timing control unit 30 maintains the current reminder determination cycle T without changing it.

Through this process, the setting of the reminder determination cycle T in the present embodiment is changed. In step S201 of the process of FIG. 13, the state information acquisition unit 25 waits for the reminder determination timing according to the reminder determination cycle T set in the process of FIG. 14 to be reached. Thereby, the terminal 2 performs the reminder determination-related process at each reminder determination cycle T set in the process of FIG. 14.

<Example of Processing Procedure of Information Processing Device 4>

Figure 15:
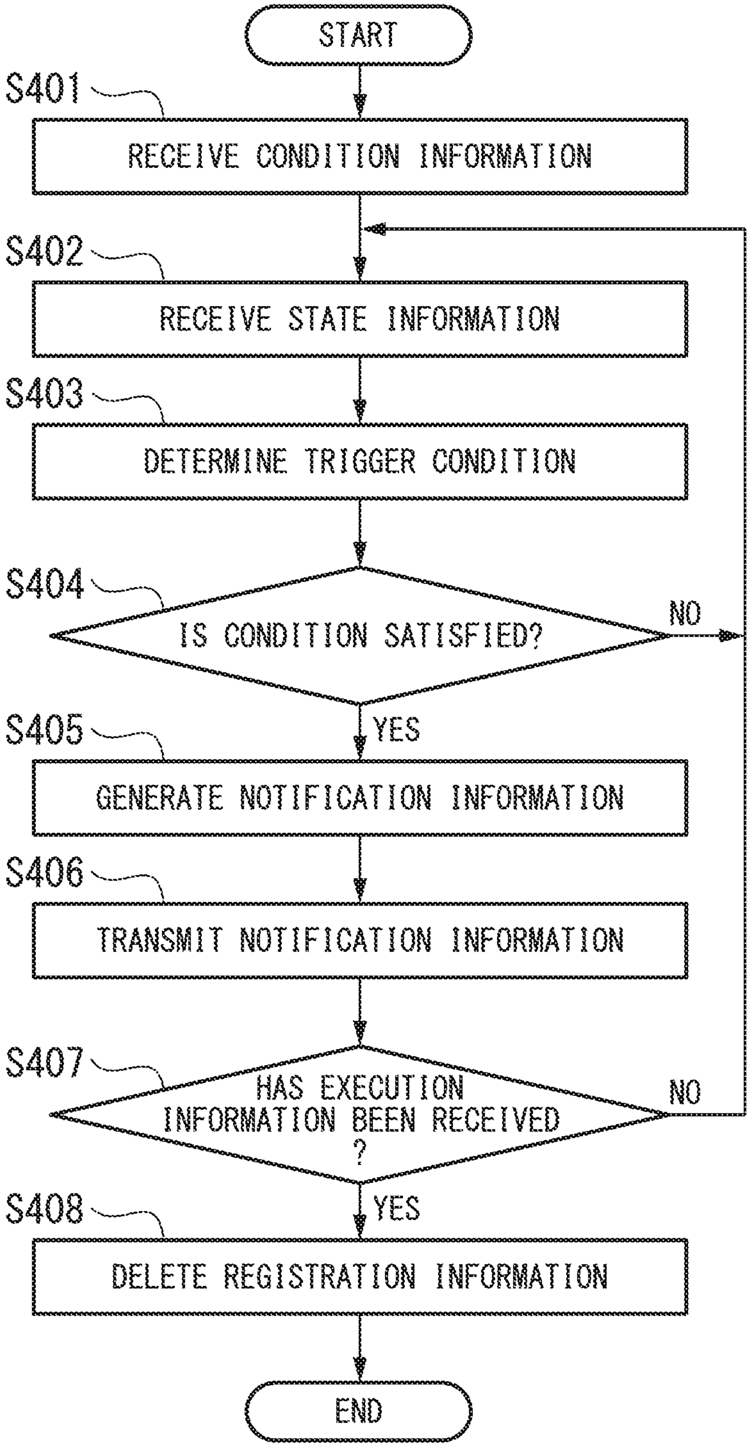
FIG. 15 is a flowchart illustrating an example of a processing procedure to be executed by the information processing device according to the first embodiment.

Next, an example of a processing procedure of the information processing device 4 will be described with reference to the flowchart of FIG. 15.

(Step S401) The acquisition unit 41 receives condition information transmitted by the terminal 2.

(Step S402) The acquisition unit 41 receives state information transmitted by the terminal 2.

(Step S403) When the state information has been input from the state information processing unit 45, the condition determination unit 46 determines whether a trigger condition is satisfied by referring to the reminder database 44. Also, the trigger condition is whether the current position information included in the state information is in a predetermined range with coordinates of a target position associated with an identifier as a center.

(Step S404) The process proceeds to the process of step S405 if the condition determination unit 46 determines that the trigger condition is satisfied (step S404; YES) and the process returns to the process of step S402 if the condition determination unit 46 determines that the trigger condition is not satisfied (step S404; NO).

(Step S405) The condition determination unit 46 generates notification information indicating that the terminal 2 is located in a predetermined range if it is determined that the current position is in the predetermined range.

(Step S406) The condition determination unit 46 transmits the generated notification information to the terminal 2 through the output unit 47.

(Step S407) The condition determination unit 46 determines whether execution information has been received from the state information processing unit 45. The process proceeds to the process of step S408 if the condition determination unit 46 determines that the execution information has been received (step S407; YES) and the process returns to the process of step S402 if the condition determination unit 46 determines that the execution information has not been received (step S407; NO).

(Step S408) The condition determination unit 46 deletes the coordinates of the target position and the target time information associated with the identifier included in the execution information from the reminder database 44.

As described above, in the present embodiment, the information processing device 4 determines a trigger condition only for a position of the terminal 2, and the terminal 2 determines a trigger condition only for a time according to notification information transmitted from the information processing device 4. Thereby, in the present embodiment, the information processing device 4 does not perform all of the reminder notification process as in the conventional technology and can perform the process in a distributed manner with the terminal 2. As a result, according to the present embodiment, it is possible to reduce the load in the information processing device 4 in the information processing system which provides a notification of a reminder. Also, unlike a case in which only the terminal 2 determines the trigger condition in terms of a position and time according to an application for providing a reminder notification installed in the terminal 2, it is possible to reduce the load on the terminal 2 and reduce the power consumption of the terminal 2.

Also, an example in which the terminal 2 transmits only the target position information as the condition information to the information processing device 4 has been described in the above-described example, but the present invention is not limited thereto. The terminal 2 may be configured to transmit only the target time information as the condition information or may be configured to transmit both the target position information and the target time information as the condition information. Also, the condition information to be transmitted from the terminal 2 to the information processing device 4 is predetermined. Alternatively, if the number of pieces of information included in the condition information received from the terminal 2 is one, the information processing device 4 may be configured to determine whether the included information is the target position information or the target time information. Therefore, the information processing device 4 may be configured to perform a process of generating the notification information according to the received condition information.

Also, the terminal 2 may be configured to transmit only the current time information as the state information or may be configured to transmit all of the current position information, the current time information, and the sensor information as the state information. Also, the state information to be transmitted from the terminal 2 to the information processing device 4 is predetermined.

Also, if the number of identifiers indicating terminals 2 for which notification condition information is registered is two or more, the information processing device 4 performs the above-described process for each terminal 2. For example, if the number of identifiers for which target positions Tg are registered is 100, the information processing device 4 determines whether each of the 100 terminals 2 is in a predetermined range. If it is determined that 10 terminals 2 among the 100 terminals 2 are in the predetermined range, the information processing device 4 transmits notification information to the terminals 2 corresponding to 10 identifiers. Thus, the information processing device 4 determines only whether the terminal 2 is in the predetermined range and does not determine whether a time at which the terminal 2 is in the predetermined range is within a second predetermined time period. Thus, it is possible to reduce the load on the information processing device 4 in the present embodiment compared with in the conventional technology when the number of terminals 2 using the present system increases.

According to this process, in the present embodiment, the terminal 2 transmits the condition information to be processed by the information processing device 4 and receives the notification information which is a determination result of the trigger condition transmitted by the information processing device 4. When the notification information has been received, the terminal 2 can determine the trigger condition by comparing the current time information acquired by the own terminal 2 with the target time information. Thus, according to the present embodiment, it is possible to reduce the load on each of the terminal 2 and the information processing device 4 because the reminder notification process can be performed by the terminal 2 and the information processing device 4 in a distributed manner.

In addition, in the present embodiment, the reminder determination cycle T is controlled so that the reminder determination cycle T in which the terminal 2 executes the reminder determination-related process in relation to the determination of the trigger condition according to a battery capacity is lengthened according to a decrease of the battery capacity. Thereby, because the number of times of execution of the reminder determination-related process per unit time is reduced in a state in which the battery capacity is small, the duration of the battery can be lengthened.

Second Embodiment

Next, the second embodiment will be described. A condition of a reminder notification of the present embodiment includes an element of a distance of a current position from a target position indicating that the current position is in a predetermined range including a target position. Considering this, the accuracy of the reminder notification is required to be higher when the current position is closer to the target position. In this case, it is preferable to shorten the reminder determination cycle T.

Therefore, in the present embodiment, correction is performed so that the reminder determination cycle T based on the battery capacity is shortened when the current position is close to the target position. Thereby, after the reminder determination cycle T is set to be longer according to the decrease of the battery capacity, it is adjusted to be shortened to a certain extent when the current position is close to the target position. Thereby, after the battery capacity is maintained, it is also possible to maintain the accuracy of the reminder notification at a fixed level or more.

In the present embodiment, for example, a plurality of areas according to each predetermined distance range having the target position as a reference are set.

Figures 16, 17:
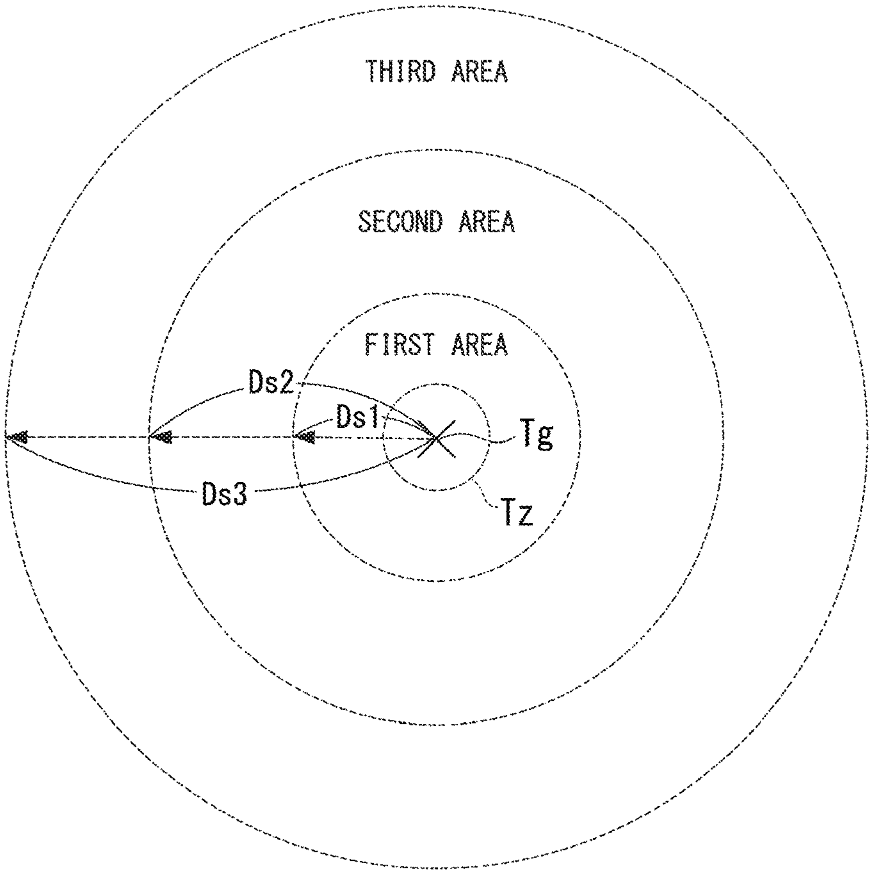
FIG. 16 is a diagram illustrating an example of area setting according to a second embodiment.
FIG. 17 is a diagram illustrating an example of an area correspondence correction value table according to the second embodiment.

FIG. 16 is a diagram illustrating an example of area setting according to the present embodiment. In FIG. 16, an area having a radius to a distance Ds1 around the target position Tg is designated as a first area. Here, a predetermined range in which a reminder notification is provided indicated by a circle Tz in FIG. 6 is included in the first area as illustrated in FIG. 16.

Also, a range from the distance Ds1 to a distance Ds2 around the target position Tg outside the first area is designated as a second area. Also, a range from the distance Ds2 to a distance Ds3 around the target position Tg is designated as a third area.

In the present embodiment, the reminder database 23 stores an area correspondence correction value table in which a correction value corresponds to each area after three areas with the target position as a reference (a center) are set as described above.

FIG. 17 is a diagram illustrating an example of an area correspondence correction value table. The area correspondence correction value table of FIG. 17 is a structure in which correction values $\alpha_1$, $\alpha_2$, and $\alpha_3$ are stored in correspondence with the first area, the second area, and the third area set as illustrated in FIG. 16.

Here, the correction values $\alpha_1$, $\alpha_2$, and $\alpha_3$ have a relationship based on the following formula.

$$0<\alpha_1<\alpha_2<\alpha_3<1$$

The correction values $\alpha_1$, $\alpha_2$, and $\alpha_3$ are coefficients by which the reminder determination cycle T set on the basis of a battery capacity is multiplied. By multiplying the reminder determination cycle T by the correction values $\alpha_1$, $\alpha_2$, and $\alpha_3$, correction is performed so that the reminder determination cycle T set on the basis of a battery capacity is shortened when the current position of the terminal 2 is close to the target position.

Also, in this case, significant correction is not performed when the current position is in an area outside the third area. That is, in this case, the correction value is 1.

Also, the number of areas and the number of correction values according to the number of areas are not particularly limited.

Figure 18:
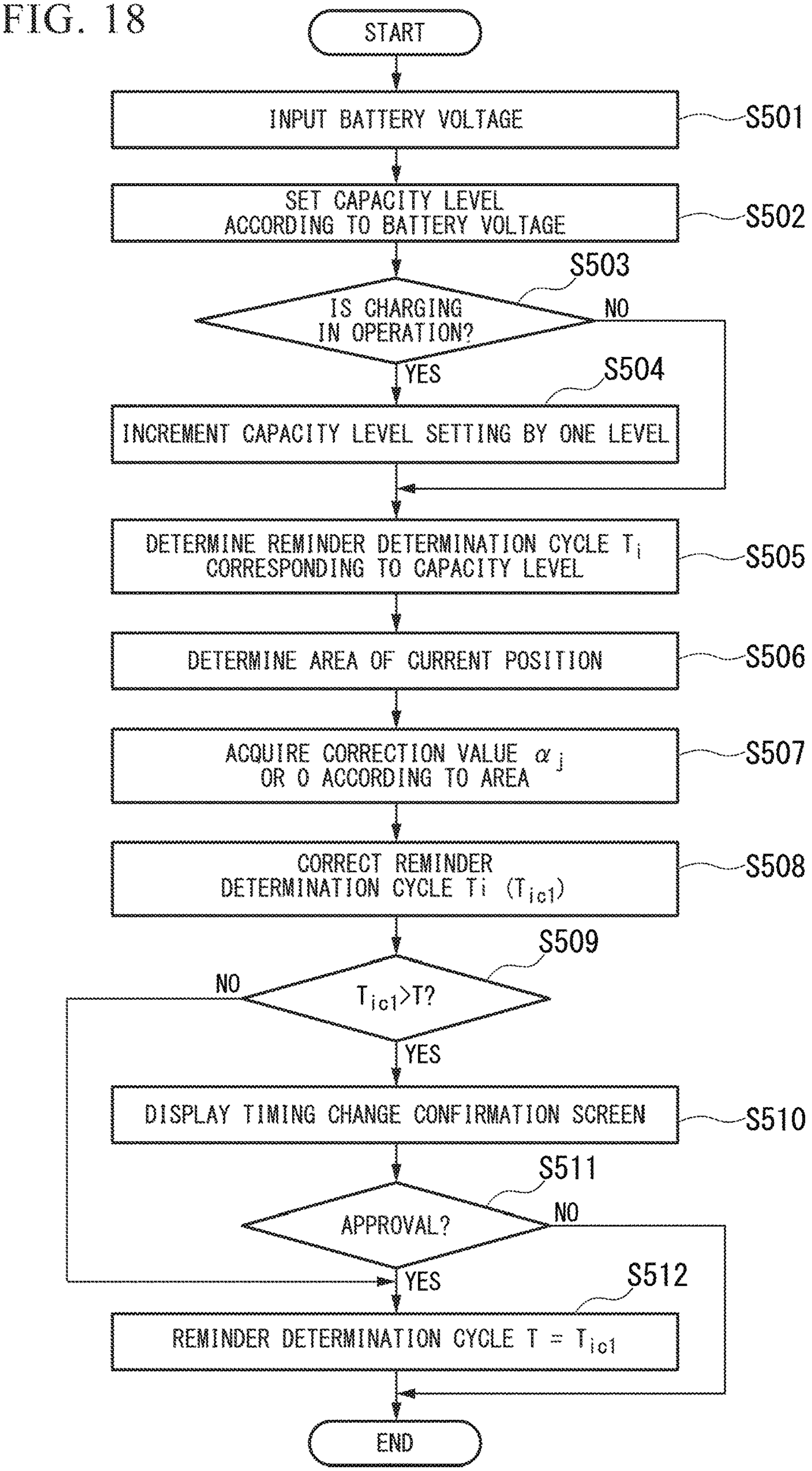
FIG. 18 is a flowchart illustrating an example of a processing procedure to be executed by the terminal for a reminder notification according to the second embodiment.

The flowchart of FIG. 18 shows a processing procedure to be executed by the terminal 2 of the present embodiment to set the reminder determination cycle T. Also, as in FIG. 14, the process of FIG. 18 is also executed at a fixed time interval shorter than the shortest reminder determination cycle $T_1$.

Because the processes of steps S501 to S505 in FIG. 18 are similar to steps S301 to S305 of FIG. 14, description thereof will be omitted here.

(Step S506) The timing control unit 30 determines an area including the current position of the terminal 2. Thus, the timing control unit 30 acquires the current position of the terminal 2 from the GPS unit 251. The current position measured by the GPS unit 251 is indicated by coordinates according to latitude and longitude. Also, the timing control unit 30 acquires a target position indicated by the coordinates according to the latitude and longitude from the reminder database 23. The timing control unit 30 calculates a distance from the current position to the target position using the coordinates of the current position and the target position acquired as described above. The timing control unit 30 determines one of the first area, the second area, the third area, and an area outside the third area corresponding to a distance range corresponding to the calculated distance. As described above, the timing control unit 30 can determine an area including the current position of the terminal 2.

(Step S507) The timing control unit 30 acquires a correction value according to the area determined in step S506 with reference to the area correspondence correction value table stored by the reminder database 23. Specifically, the timing control unit 30 acquires the correction value $\alpha_j$ (j is one of 1, 2, and 3) according to the determined area if the area determined in step S506 is one of the first to third areas. The timing control unit 30 acquires "1" as the correction value if the area determined in step S506 is outside the third area.

(Step S508) The timing control unit 30 performs correction based on the correction value acquired in step S507 with respect to the reminder determination cycle $T_i$ determined in step S505 and calculates a corrected reminder determination cycle $T_{ic1}$. The timing control unit 30 can calculate the corrected reminder determination cycle $T_{ic1}$ according to the following equation.

$$T_{ic1}=T_i\times\alpha_j$$

(Step S509) The timing control unit 30 determines whether the corrected reminder determination cycle $T_{ic1}$ calculated in step S508 is longer than the current reminder determination cycle T.

(Step S510) If the corrected reminder determination cycle $T_{ic1}$ is longer than the current reminder determination cycle T (step S509; YES), the timing control unit 30 causes the timing change confirmation screen to be displayed.

(Step S511) After the timing change confirmation screen is displayed, the timing control unit 30 determines whether an operation of approving the change of the reminder determination cycle T has been performed as an operation on the timing change confirmation screen.

(Step S512) If the operation of approving the change of the reminder determination cycle T has been performed (step S511; YES) or if the corrected reminder determination cycle $T_{ic1}$ is less than or equal to the current reminder determination cycle T (step S509; NO), the timing control unit 30 executes the following process. That is, the timing control unit 30 changes the current reminder determination cycle T to the corrected reminder determination cycle $T_{ic1}$.

Also, if an operation of rejecting the change of the reminder determination cycle T has been performed as an operation on the timing change confirmation screen (step S511; NO), the timing control unit 30 ends the process of FIG. 18 by skipping step S512. That is, in this case, the timing control unit 30 maintains the current reminder determination cycle T without changing it.

Through this process, correction is performed so that the reminder determination cycle T based on the battery capacity is shortened when a distance from the current position to the target position is shortened.

Third Embodiment

Next, the third embodiment will be described. Because the terminal 2 is carried by the user, a movement speed of the user, i.e., a movement speed of the terminal 2, differs according to behavior of the user. For example, the movement speed is slow in a situation in which the user walks, but, for example, the movement speed is fast when the user moves in a vehicle such as a train or a car. Here, focusing on the relationship between the reminder notification and the movement speed of the terminal 2, for example, the terminal 2 is likely to become quickly closer to the target position when the movement speed of the terminal 2 is faster. In consideration of this, the accuracy of the reminder notification is also required to be higher according to an increase of the movement speed of the terminal 2.

Therefore, in the present embodiment, correction is performed so that the reminder determination cycle T based on the battery capacity is shortened when the movement speed of the terminal 2 is high. Thereby, after the reminder determination cycle T is set to be longer according to a decrease of the battery capacity, the reminder determination cycle T is adjusted to be shortened to a certain extent when the movement speed of the terminal 2 is high. Thereby, after the battery capacity is maintained, it is possible to maintain the accuracy of the reminder notification at a fixed level or more according to the movement speed of the user.

In the present embodiment, the reminder database 23 stores a movement speed correspondence correction value table.

FIG. 19 illustrates an example of the movement speed correspondence correction value table. The movement speed correspondence correction value table of FIG. 19 is a structure in which correction values $\beta_1$, $\beta_2$, and $\beta_3$ are stored in each range of three preset movement speeds V (each movement speed range).

Boundary speeds $V_A$, $V_B$, $V_C$, and $V_D$ in the movement speed range have a relationship of $V_A<V_B<V_C<V_D$. Also, the correction values $\beta_1$, $\beta_2$, and $\beta_3$ have a relationship of $\beta_1>\beta_2>\beta_3$.

These correction values are coefficients by which the reminder determination cycle T set on the basis of a battery capacity is multiplied. By multiplying the reminder determination cycle T by these correction values, the terminal 2 performs correction so that the reminder determination cycle T set on the basis of the battery capacity is shortened when the movement speed is high.

Also, in this case, significant correction is not performed when the movement speed V is lower than the boundary speed $V_A$. That is, in this case, the correction value is "1."

An example of a processing procedure to be performed by the terminal 2 of the present embodiment to set the reminder determination cycle T will be described with reference to the flowchart of FIG. 20. Also, as in FIG. 14, the process of FIG. 20 is executed at each fixed time interval shorter than the shortest reminder determination cycle $T_1$.

Figure 20:
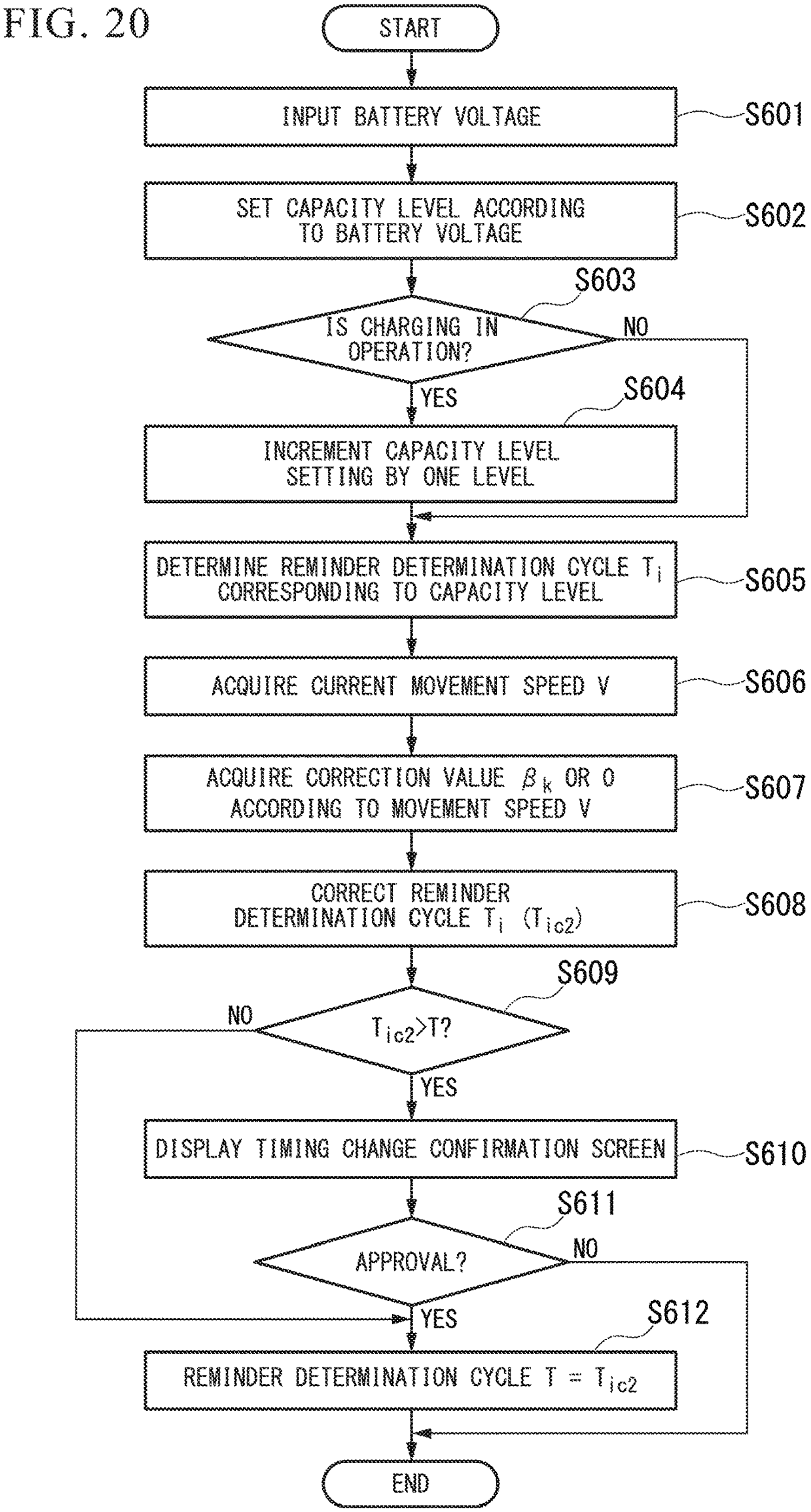
FIG. 20 is a flowchart illustrating an example of a processing procedure to be executed by a terminal for a reminder notification according to the third embodiment.

Because the processes of steps S601 to S605 in FIG. 20 are similar to steps S301 to S305 of FIG. 14, description thereof will be omitted here.

(Step S606) The timing control unit 30 acquires a current movement speed of the terminal 2. The movement speed of the terminal 2 can be calculated by the reminder generation unit 28 as described above. The timing control unit 30 causes the reminder generation unit 28 to calculate the current movement speed of the terminal 2 and acquires the calculated movement speed V.

(Step S607) The timing control unit 30 acquires a correction value corresponding to the movement speed V determined in step S606 by referring to a movement speed correspondence correction value table stored by the reminder database 23. The timing control unit 30 acquires a correction value $\beta_k$ (k=1, 2, 3) corresponding to the determined movement speed range if the movement speed V determined in step S606 is included in a movement speed range of any one of $V_A\le V<V_B$, $V_B\le V<V_C$, and $V_C\le V<V_D$.

The timing control unit 30 acquires "1" as the correction value if the speed determined in step S606 is lower than the boundary speed $V_A$.

(Step S608) The timing control unit 30 calculates a corrected reminder determination cycle $T_{ic2}$ by performing correction based on the correction value acquired in step S607 with respect to the reminder determination cycle $T_i$ determined in step S605. The timing control unit 30 calculates the corrected reminder determination cycle $T_{ic2}$ according to the following equation.

$$T_{ic2}=T_i\times\beta_k$$

(Step S609) The timing control unit 30 determines whether the corrected reminder determination cycle $T_{ic2}$ calculated in step S608 is longer than the current reminder determination cycle T.

(Step S610) If the corrected reminder determination cycle $T_{ic2}$ is longer than the current reminder determination cycle T (step S609; YES), the timing control unit 30 causes the timing change confirmation screen to be displayed.

(Step S611) The timing control unit 30 determines whether an operation of approving the change of the reminder determination cycle T has been performed as an operation on the timing change confirmation screen.

(Step S612) If the corrected reminder determination cycle $T_{ic2}$ is less than or equal to the current reminder determination cycle T (step S609; NO) or if the operation of approving the change of the reminder determination cycle T has been performed (step S611; YES), the timing control unit 30 executes the following process. That is, the timing control unit 30 changes the current reminder determination cycle T to the corrected reminder determination cycle $T_{ic2}$.

Also, if the operation of rejecting the change of the reminder determination cycle T has been performed as the operation on the timing change confirmation screen (step S611; NO), the timing control unit 30 ends the process of FIG. 20 by skipping step S612. That is, in this case, the timing control unit 30 maintains the current reminder determination cycle T without changing it.

Through this process, correction is performed so that the reminder determination cycle T is shortened on the basis of the battery capacity when the movement speed of the terminal 2 (i.e., the movement speed of the user) is high.

Also, in the present embodiment, a relationship of $\beta_1>\beta_2>\beta_3$ is set with respect to correction values $\beta_1$, $\beta_2$, and $\beta_3$ because a case in which the movement speed of the terminal 2 being fast corresponds to a situation in which the terminal 2 is close to the target position is assumed.

However, when the movement speed of the terminal 2 is fast, a situation in which the terminal 2 is distant from the target position may be similarly assumed. Therefore, in contrast to the above-described example, a relationship of $\beta_1<\beta_2<\beta_3$ may be set with respect to the correction values $\beta_1$, $\beta_2$, and $\beta_3$.

Further, a first movement speed correspondence correction value table in which the relationship of $\beta_1>\beta_2>\beta_3$ is set with respect to the correction values $\beta_1$, $\beta_2$, and $\beta_3$ and a second movement speed correspondence correction value table in which the relationship of $\beta_1<\beta_2<\beta_3$ is set may be stored in the reminder database 23. The timing control unit 30 determines whether the current movement of the terminal 2 is close to or distant from the target position when the correction value is set. If it is determined that the current movement is close to the target position, the timing control unit 30 acquires the correction value $\beta_k$ according to the movement speed V from the first movement speed correspondence correction value table. On the other hand, if it is determined that the current movement is distant from the target position, the timing control unit 30 acquires the correction value $\beta_k$ according to the movement speed V from the second movement speed correspondence correction value table. Therefore, the timing control unit 30 may correct a reminder determination cycle $T_i$ according to the acquired correction value $\beta_k$.

Also, when the reminder determination cycle $T_i$ is corrected, for example, the correction value $\alpha_j$ according to an area in the second embodiment and the correction value $\beta_k$ according to an area in the third embodiment may be used together. In this case, if the corrected reminder determination cycle is designated as $T_{ic3}$, the corrected reminder determination cycle $T_{ic3}$ can be obtained according to the following equation.

$$T_{ic3}=T_i\times\alpha_j\times\beta_k$$

Also, an example in which the terminal 2 acquires and transmits current position information has been described in each embodiment described above, but information to be acquired and transmitted may be current time information or sensor information. Even in this case, an effect similar to the above-described effect is obtained.

Also, an example in which the first condition is the target position information and the second condition is the target time information as the example of the notification condition information has been described in each embodiment described above, but the present invention is not limited thereto. The notification condition is not limited to the two conditions, and may include, for example, information indicating an objective of a notification of a reminder or the like. Also, the first condition may be the target time information and the second condition may be the target position information.

Also, the above-described process may be performed by recording a program for implementing some or all functions of the terminal 2 or the information processing device 4 provided in the information processing system 1 in the present invention on a computer-readable recording medium and causing a computer system to read and execute the program recorded on the recording medium. Also, the "computer system" used here is assumed to include an operating system (OS) and hardware such as peripheral devices. Also, the computer system is assumed to include a World Wide Web (WWW) system having a homepage providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a certain period of time, such as a volatile memory (random access memory (RAM)) inside a computer system serving as a server or a client when the program is transmitted via a network such as the Internet or a communication circuit such as a telephone circuit.

Also, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. Further, the above-described program may be a program capable of implementing the above-described functions in combination with a program already recorded on the computer system, i.e., a so-called differential file (differential program).

For example, the user operates the terminal 2 and downloads an application for causing the terminal 2 to perform the above-described process from, for example, the Internet. The terminal 2 may implement some of functional units provided in the terminal 2 by installing the downloaded application in the device itself.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing system including a terminal and an information processing device, wherein the terminal includes:

a condition information generation unit, implemented via a processing unit of the terminal, configured to acquire a first condition and a second condition and generate condition information using at least one of the acquired first and second conditions;

a state information generation unit, implemented via the processing unit of the terminal, configured to acquire information based on each of the first condition and the second condition and generate state information using information according to the condition information among the acquired information;

a transmission unit, implemented via the processing unit of the terminal, configured to transmit the condition information to the information processing device and transmit the state information to the information processing device at each reminder determination timing;

a reception unit, implemented via the processing unit of the terminal, configured to receive notification information from the information processing device;

a reminder generation unit, implemented via the processing unit of the terminal, configured to generate a reminder if it is determined that the state information satisfies one of the first condition and the second condition according to reception of the notification information;

a notification unit, implemented via the processing unit of the terminal, configured to provide a notification of the generated reminder;

a state-of-charge detection unit, implemented via the processing unit of the terminal, configured to detect a state of charge in the terminal; and a timing control unit, implemented via the processing unit of the terminal, configured to change the reminder determination timing according to the state of charge detected by the state-of-charge detection unit, and wherein the information processing device includes:

an acquisition unit, implemented via a processing unit of the information processing device, configured to acquire the condition information and the state information transmitted by the terminal;

a condition determination unit, implemented via the processing unit of the information processing device, configured to generate the notification information if it is determined that the acquired state information satisfies one of the first condition and the second condition included in the condition information; and an output unit, implemented via the processing unit of the information processing device, configured to transmit the notification information to the terminal.

2. The information processing system according to claim 1, wherein the timing control unit makes a change so that a time interval serving as the reminder determination timing is shortened according to an increase in a capacity of a battery based on the detected state of charge.

3. The information processing system according to claim 1, wherein the timing control unit displays a confirmation screen for allowing a user to confirm a change in the reminder determination timing according to the state of charge detected by the state-of-charge detection unit and executes control related to a change in a reminder issuance timing on the basis of an operation performed on the confirmation screen.

4. The information processing system according to claim 3, wherein the timing control unit does not change the reminder determination timing if an operation indicating that the reminder determination timing is not to be changed has been performed on the confirmation screen.

5. The information processing system according to claim 1, wherein the timing control unit corrects a time interval to be changed as the reminder determination timing on the basis of a distance between a target position indicated by target position information and a current position of the terminal as the first condition.

6. The information processing system according to claim 1, wherein the timing control unit corrects a time interval to be changed as the reminder determination timing on the basis of a movement speed of the terminal.

7. A terminal comprising:

a condition information generation unit, implemented via a processing unit of the terminal, configured to acquire a first condition and a second condition and generate condition information using at least one of the acquired first and second conditions;

a state information generation unit, implemented via the processing unit of the terminal, configured to acquire information based on each of the first condition and the second condition and generate state information using information according to the condition information among the acquired information;

a transmission unit, implemented via the processing unit of the terminal, configured to transmit the condition information to the information processing device and transmit the state information to the information processing device at each reminder determination timing;

a reception unit, implemented via the processing unit of the terminal, configured to receive notification information from the information processing device;

a reminder generation unit, implemented via the processing unit of the terminal, configured to generate a reminder if it is determined that the state information satisfies one of the first condition and the second condition according to reception of the notification information;

a notification unit, implemented via the processing unit of the terminal, configured to provide a notification of the generated reminder;

a state-of-charge detection unit, implemented via the processing unit of the terminal, configured to detect a state of charge in the terminal; and a timing control unit, implemented via the processing unit of the terminal, configured to change the reminder determination timing according to the state of charge detected by the state-of-charge detection unit.

8. An information processing method in an information processing system including a terminal and an information processing device, the information processing method comprising:

a condition information generation procedure in which a condition information generation unit of the terminal acquires a first condition and a second condition and generates condition information using at least one of the acquired first and second conditions;

a state information generation procedure in which a state information generation unit of the terminal acquires information based on each of the first condition and the second condition and generates state information using information corresponding to the condition information among the acquired information;

a transmission procedure in which a transmission unit of the terminal transmits the condition information to the information processing device and transmits the state information to the information processing device at each reminder determination timing;

a reception procedure in which a reception unit of the terminal receives notification information from the information processing device;

a reminder generation procedure in which a reminder generation unit of the terminal generates a reminder if it is determined that the state information satisfies one of the first condition and the second condition when the notification information is received;

a notification procedure in which a notification unit of the terminal provides a notification of the generated reminder;

a state-of-charge detection procedure in which a state-of-charge detection unit of the terminal detects a state of charge in the terminal;

a timing control procedure in which a timing control unit of the terminal changes the reminder determination timing according to the state of charge detected by the state-of-charge detection unit;

an acquisition procedure in which an acquisition unit of the information processing device acquires the condition information and the state information transmitted by the terminal;

a condition determination procedure in which a condition determination unit of the information processing device generates the notification information if it is determined that the acquired state information satisfies one of the first condition and the second condition included in the condition information; and an output procedure in which an output unit of the information processing device transmits the notification information to the terminal.

9. An information processing method of a terminal, the information processing method comprising:

a condition information generation procedure in which a condition information generation unit acquires a first condition and a second condition and generates condition information using at least one of the acquired first and second conditions;

a state information generation procedure in which a state information generation unit acquires information based on each of the first condition and the second condition and generates state information using information corresponding to the condition information among the acquired information;

a transmission procedure in which a transmission unit transmits the condition information to the information processing device and transmits the state information to the information processing device at each reminder determination timing;

a reception procedure in which a reception unit receives notification information from the information processing device;

a reminder generation procedure in which a reminder generation unit generates a reminder if it is determined that the state information satisfies one of the first condition and the second condition when the notification information is received;

a notification procedure in which a notification unit provides a notification of the generated reminder;

a state-of-charge detection procedure in which a state-of-charge detection unit detects a state of charge in the terminal; and a timing control procedure in which a timing control unit changes the reminder determination timing according to the state of charge detected in the state-of-charge detection procedure.

10. A program stored on a non-transitory computer-readable recording medium comprising computer-executable instructions, which when executed via a processing unit on a computer, cause the computer of a terminal to execute:

a condition information generation procedure of acquiring a first condition and a second condition and generating condition information using at least one of the acquired first and second conditions;

a state information generation procedure of acquiring information based on each of the first condition and the second condition and generating state information using information corresponding to the condition information among the acquired information;

a transmission procedure of transmitting the condition information to the information processing device and transmitting the state information to the information processing device at each reminder determination timing;

a reception procedure of receiving notification information from the information processing device;

a reminder generation procedure of generating a reminder if it is determined that the state information satisfies one of the first condition and the second condition when the notification information is received;

a notification procedure of providing a notification of the generated reminder;

a state-of-charge detection procedure of detecting a state of charge in the terminal; and a timing control procedure of changing the reminder determination timing according to the state of charge detected in the state-of-charge detection procedure.

* * * * *